(12) United States Patent
Abe

(10) Patent No.: US 6,504,732 B2
(45) Date of Patent: Jan. 7, 2003

(54) NON-CONTACT ELECTRICAL POWER TRANSMISSION SYSTEM HAVING FUNCTION OF MAKING LOAD VOLTAGE CONSTANT

(75) Inventor: Hideaki Abe, Neyagawa (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/793,154

(22) Filed: Feb. 26, 2001

(65) Prior Publication Data

US 2001/0017781 A1 Aug. 30, 2001

(30) Foreign Application Priority Data

Feb. 24, 2000 (JP) ......................... 2000-048351
Aug. 28, 2000 (JP) ......................... 2000-256643

(51) Int. Cl.$^7$ ................................. H02J 1/00
(52) U.S. Cl. ............................. 363/17; 363/16
(58) Field of Search ..................... 363/16, 17, 37, 363/40, 98, 89, 127, 132

(56) References Cited

U.S. PATENT DOCUMENTS

| | | | | |
|---|---|---|---|---|
| 4,692,851 A | * | 9/1987 | Attwood ................... | 363/16 |
| 5,729,445 A | | 3/1998 | Huelsmann ................ | 363/34 |
| 5,926,381 A | | 7/1999 | Moriguchi et al. .......... | 363/17 |
| 6,108,216 A | * | 8/2000 | Abe et al. ................ | 363/17 |
| 6,301,128 B1 | * | 10/2001 | Jang et al. ............... | 363/17 |

FOREIGN PATENT DOCUMENTS

JP        08080042        3/1996

* cited by examiner

Primary Examiner—Rajnikant B. Patel
(74) Attorney, Agent, or Firm—Darby & Darby

(57) ABSTRACT

A transformer separable/detachable between a primary winding and a secondary winding, has a capacitor connected parallel to the secondary winding. A high-frequency AC voltage supplied to the primary winding of the transformer generates an induced voltage in the secondary winding. The secondary winding transmits electrical power to a load in non-contact manner. Either the output voltage remains constant as the output current varies, or vice versa. Taking as a first condition a fact that at the time of a maximum load, the time of the reversal of the voltage polarity of the primary winding substantially coincides with the time when an oscillating voltage of the capacitor reaches a maximum or minimum value. Taking as a second condition a fact that at the time of a minimum load, the time of the reversal of the voltage polarity of the above-mentioned primary winding substantially coincides with the time when the oscillating voltage of the above-mentioned capacitor completes one cycle. The capacitance of the capacitor is selected to satisfy simultaneously the first and second conditions. This allows the load voltage to remain constant in a load current range from a minimum to a maximum without requiring a feedback circuit.

32 Claims, 33 Drawing Sheets

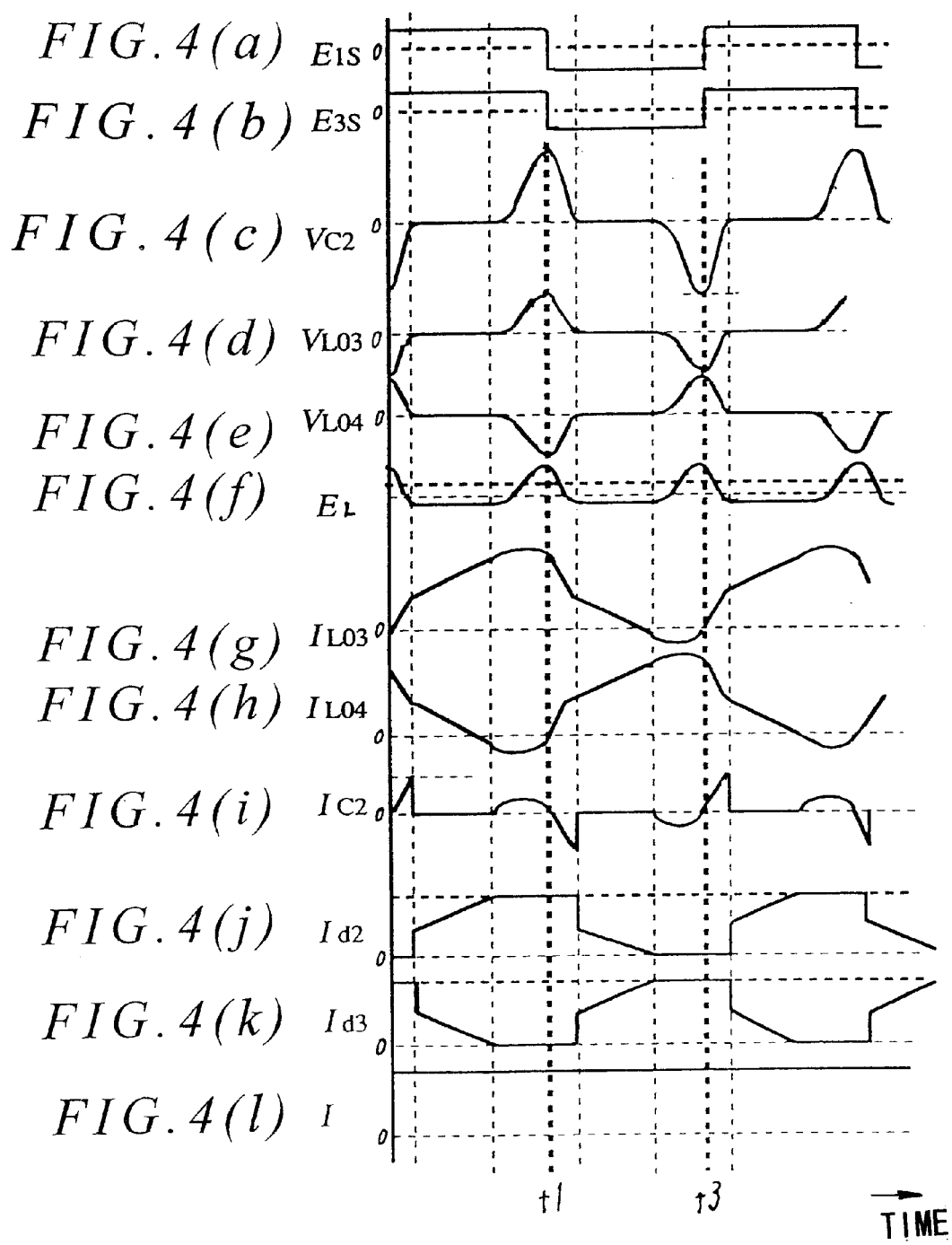

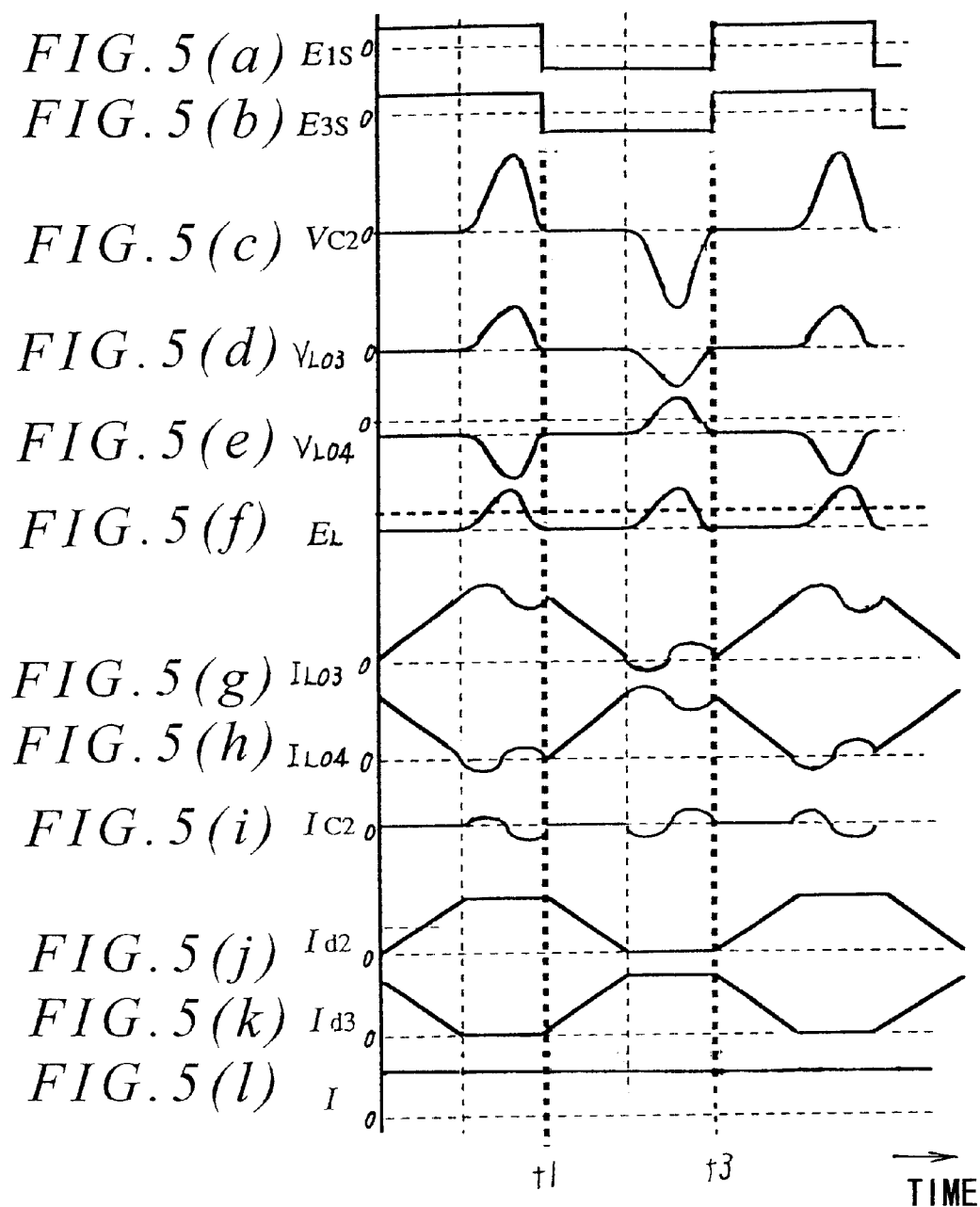

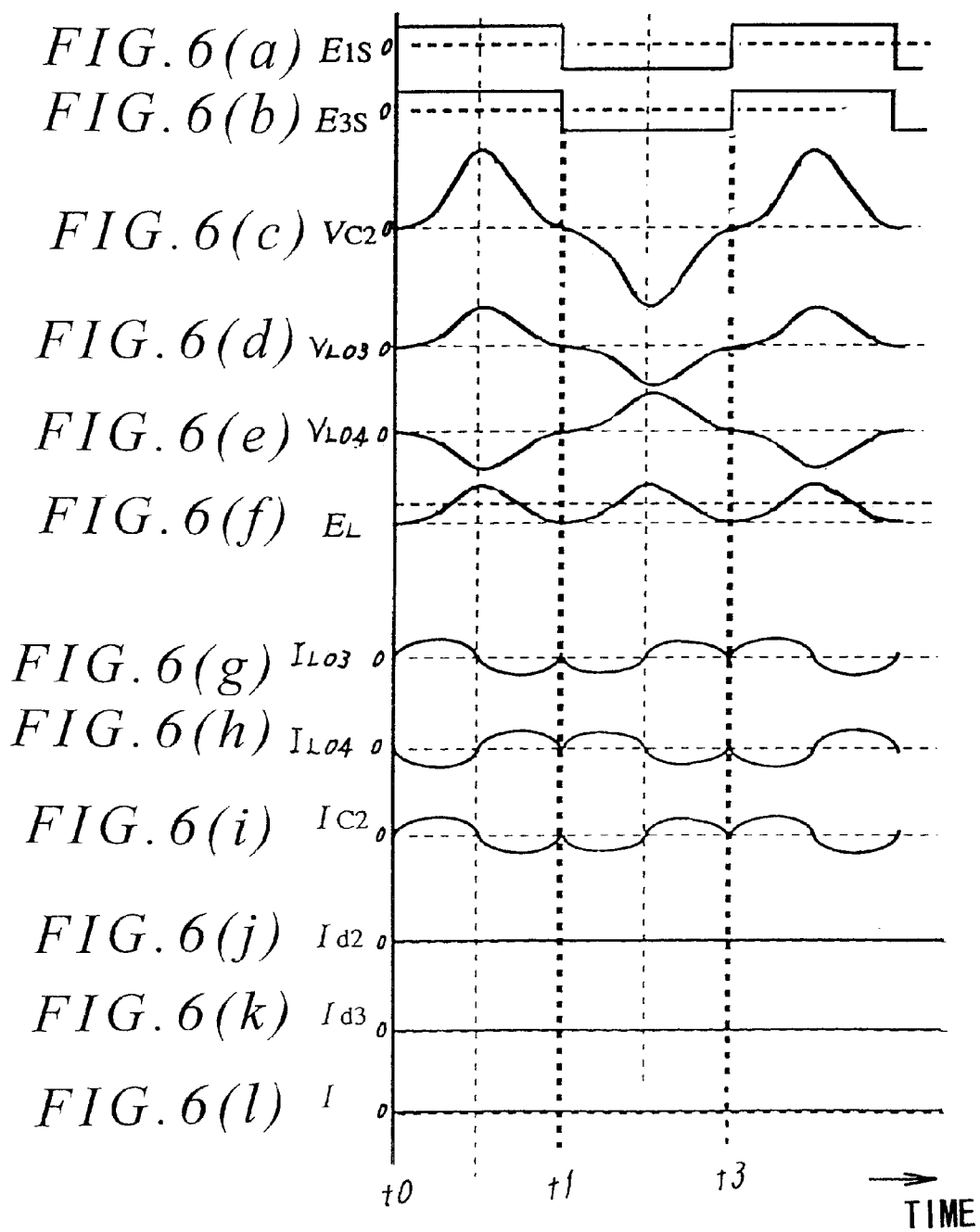

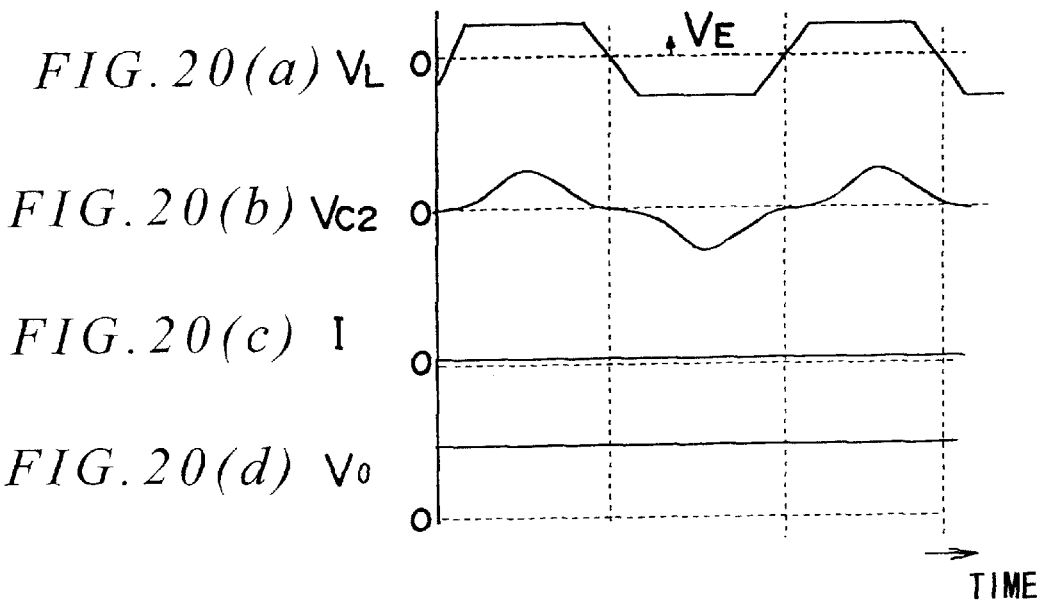
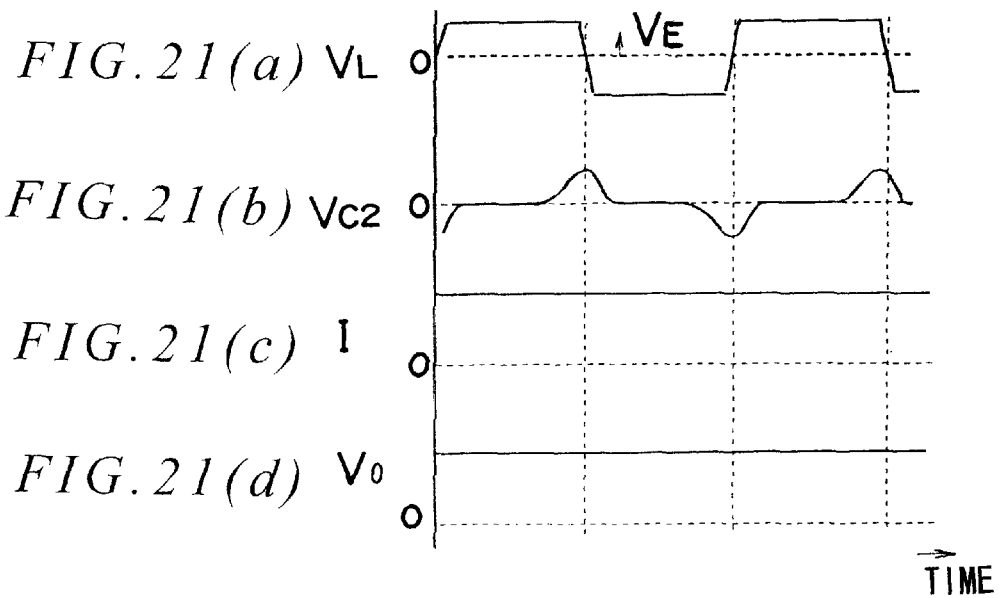

WAVEFORM IN POINT E

SECONDARY SIDE

NON-CONTACT ELECTRICAL POWER TRANSMISSION SYSTEM HAVING FUNCTION OF MAKING LOAD VOLTAGE CONSTANT

BACKGROUND OF THE INVENTION

The present invention relates to a non-contact electrical power transmission system which includes a transformer with separable primary and secondary windings. The system transmits electric power from the primary side to the secondary side of the transformer in a condition in which a core wrapped with a primary winding and a core wrapped with a secondary winding remain out of contact with each other.

Heretofore, in many places, a non-contact electrical power transmission system has been commercially applied. Such systems configure a transformer in which the primary winding and the secondary winding are separable from each other with a core wrapped with a primary winding and a core wrapped with a secondary winding. The system transmits power from the primary side to the secondary side by electromagnetic induction with the primary core and the secondary core remaining out of contact with each other.

However, in most conventional non-contact electrical power transmission systems, a load connected between output terminals at the secondary side of a transformer has been specified. There has not been discovered a commercially applied example of a non-contact electrical power transmission system which is applicable to plural kinds of loads as a load connectable between output terminals, and also even to a kind of load whose current changes over a wide range.

Meanwhile, such non-contact electrical power transmission systems transmit an electric power from the primary side to the secondary side with an electrical insulator between the primary side of the above-mentioned transformer as electric power supply side and the secondary side having a load connected between output terminals. The degree of magnetic coupling of transformer is low, the magnetic flux interlinked to the secondary winding is fewer than that generated in the primary winding, and a leakage inductance develops due to leakage magnetic flux.

Although the frequency of a high-frequency AC voltage supplied to the primary winding of such transformers is generally in the audible-range frequency or above (about 20 kHz or more), the above-mentioned separable transformer is low in the degree of magnetic coupling and has a leakage inductance, whereby the induced voltage in the secondary winding is reduced and a voltage drop in induction reactance due to leakage inductance develops. As a result, the voltage supplied to a load may be smaller than a desired load voltage, or the current flowing to a load may be smaller than a desired load current. Explaining with a specific example, where various plural kinds of devices with a constant load voltage and variable load current are applicable to a load, the larger the load current of a load, the lower the voltage across the load becomes, whereby the performance inherent in devices cannot be exhibited.

Referring to FIG. 39(A), a prior-art rectifier circuit 7 is connected to the secondary side of a separable transformer T. A circuit for supplying a load current I to a load 10 consists of a variable resistance in series with a choke coil LCH. A high-frequency AC voltage is applied by an inverter 3 to the primary side of the transformer T. A secondary winding n2 of the transformer T includes a center tap 5e. One terminal of the load 10 is connected to the center tap 5e. The ends of the secondary winding n2 are connected to the anodes of diodes D2 and D3. The cathodes of the diodes D2 and D3 are connected together, and their junction is connected to the choke coil LCH. A capacitor C3 is connected in parallel with the load 10.

In the circuit shown in FIG. 39(A), a high-frequency square-wave AC voltage, having a maximum amplitude 70 volts and a frequency of about 97 kHz as shown in FIG. 39(B) is applied to a primary winding n1 of the transformer T. With the inductance value of the choke coil LCH taken as 100 $\mu$H, the capacitance of the capacitor C3 connected parallel to the load 10 taken as 100 $\mu$F, a gap g between a primary core 5c of the transformer T and a secondary core 5d taken as 2 mm, measuring a load voltage (output voltage)/load current characteristics and a load power/load current characteristics by changing variously the resistance value of the load 10 causes characteristics to be obtained as shown in FIG. 41. In FIG. 41, the axis of abscissa is for a load current 1, the axis of ordinate on the left side for a load voltage V0, and the axis of the ordinate on the right side for a load power P, the curve V indicating the load voltage and the curve P indicating the load power.

The transformer T has a configuration as shown in FIG. 40, in which the primary winding n1 is separately wrapped at two leg portions of the U-type primary core 5c, the secondary winding n2 is separately wrapped at two leg portions of the U-type secondary core 5d, and the center tap 5e is provided at the middle point of the secondary winding n2. Now, the inductance value when viewed from the primary. winding terminals A–A' of the transformer T is 112 $\mu$H, the inductance value when viewed from the secondary winding terminals B–B' is 42 $\mu$H, and the mutual inductance value between the primary winding n1 and the secondary winding n2 is 91 $\mu$H.

It will be understood from FIG. 41 that as the load current I increases, the load voltage V0 substantially decreases monotonously, while the load power P becomes smaller in increased values (becomes saturated) as the load current I becomes larger. In a non-contact electrical power transmission system for charging load 10, a matching capacitor is connected in parallel or series with the secondary winding n2 of the transformer T in order to offset an effect due to the leakage inductance of the transformer T, thereby increasing an effective power taken from the primary side to secondary side of the transformer T (improving a power factor by load matching). Providing such a matching capacitor causes a power transmission efficiency to be significantly improved for a certain load, thereby allowing the system to be miniaturized. Therefore, the matching capacitor is an important component in commercially applying a non-contact electrical power transmission system.

However, in a non-contact electrical power transmission system provided with the above-mentioned matching capacitor, a problem exits in that for a load whose load current I varies largely, the load voltage V0 lowers remarkably compared with a case where no matching capacitor is provided. For example, in a system which has substantially the same circuit configuration as shown in the above-mentioned FIG. 39(A) and in which the secondary winding n2 of the separable transformer T is connected in parallel with a matching capacitor C2 as shown in FIG. 42(A), supplying a high-frequency AC voltage of the square-wave shape having a maximum amplitude 70 volt and a frequency of about 97 kHz as shown in FIG. 42(B) to the primary winding n1 of the transformer T and changing variously the resistance value of the load 10 consisting of a variable resistance causes a load voltage/load current characteristics and a load power/load current characteristics as shown in FIG. 44 to be obtained. Now, in FIG. 44, the axis of abscissa is for the load current I, the axis of ordinate on the left side for the load voltage V0, and the axis of the ordinate on the right side for the load power P, the curve V indicating the load voltage and the curve P indicating the load power. Hereinafter, a value obtained with (varying range of load voltage V0)/(varying range of load current) is referred to as the voltage change rate.

It will be understood from FIG. 44 that the more the load current I increases, the more the voltage change rate of the load voltage V0 becomes large. It will be also understood that as load current I increases, the load power P exhibits a characteristics having a peak at a certain load current value. Furthermore, it will be understood that in a load current region for a very small load current I, the load voltage V0 becomes large. In the circuit shown in FIG. 42(A), an equivalent circuit converted to secondary side using a voltage induced in the secondary winding n2 of the transformer T is expressed as shown in FIG. 43. A portion between an end to which a diode D2 of the secondary winding n2 in FIG. 42(A) is connected and the center tap $5e$ is expressed equivalently with a high-frequency AC source I a and an inductance L03 in FIG. 43, while a portion between the other end of the secondary winding n2 and the center tap $5e$ is expressed with a high-frequency AC source $1b$ and an inductance L04 in FIG. 43.

In the non-contact electrical power transmission system having characteristics shown in FIG. 44, as a method of making constant (stabilizing) the load voltage for a plural kinds of loads identical in load voltage and different in power, that is, different in load current, there is devised a method such as that of providing a feedback control circuit which detects a load voltage at the secondary side of the transformer T, compares said detected voltage with a reference value to amplify an error, transmits in non-contact fashion the error-amplified signal to the primary side of the transformer T, and controls the amplitude, frequency and duty of the high-frequency AC voltage supplied to the primary winding n1 of the transformer T, or that of providing an independent stabilizing source circuit at the secondary side of the transformer T and connecting the circuit to the load.

However, providing such a feedback control circuit and a stabilizing source circuit causes the number of parts to increase and the cost to become higher. Now, the better the stability of a load voltage, the higher the effect obtained by providing these circuits becomes, thereby allowing a reduced number of additional parts to be expected. Hence, there has been expected an inexpensive non-contact electrical power transmission system having a relatively simple circuit which can make constant a load voltage (output voltage) in a wide load current without adding the feedback control circuit.

Furthermore, as a solution to a problem that as mentioned above, the larger the load current in a device, the lower the output terminal voltage becomes, thereby causing a performance inherent to the device not to be exhibited, for example, detecting the output terminal voltage and feeding back signals from the secondary side to the primary side to control allows the output terminal voltage to be stabilized.

However, even in such a manner, the relationship of the output terminal voltage and load power with the load current is such that as shown in FIG. 36, the load power P is substantially proportional to the load current I, and the output terminal voltage V0 is stabilized in a light load through full load region B, but it becomes rapidly larger in a no load through minute load region A. For non-contact charge or power transmission, in order to pick up a more amount of effective power even if a little on the secondary side of the separable/detachable transformer, a matching capacitor for load matching is often provided on the secondary winding side. It will be assumed that providing the matching capacitor causes the unique above-mentioned voltage rise different from the switching source due to normal contact coupling at the time of no-load/minute load. In order to control the output terminal voltage rise, dummy loads such as dummy resistances are connected parallel to the output terminal to generate a loss at all time to control, but in this method, a power loss at the dummy voltage becomes several watts or more, and the circuit size becomes large or the cost increases in order to control the efficiency decrease and temperature rise.

OBJECTS AND SUMMARY

It is an object of the present invention to provide an inexpensive non-contact electrical power transmission system capable of making constant a load voltage in a wide load current range without making complex the circuit configuration.

It is another object of the present invention to provide a non-contact electrical power transmission system capable of controlling the output terminal voltage rise even at the time of no load/minute load, and capable of making lower a loss even a case of connecting the dummy load.

The non-contact electrical power transmission system according to the present invention comprises a transformer having a primary winding and a secondary winding separable and detachable therebetween, a capacitor connected parallel to the secondary winding of the above-mentioned transformer, and an output terminal provided on the above-mentioned secondary winding side and connected with a load, and supplies a high-frequency AC voltage to the above-mentioned primary winding to flow a high-frequency current to the above-mentioned primary winding, and generates an induced voltage on the secondary winding by the electromagnetic induction action, whereby a power is supplied to the load connected to the above-mentioned output terminal. This system is configured such that a voltage supplied to the above-mentioned load is substantially constant, a flowing current varies, and a power is supplied to a different load, and in the system, taking as a first condition a fact that at the time of maximum load, the time of the reversal of the voltage polarity in the above-mentioned primary winding substantially coincides with the time of the oscillating voltage of the above-mentioned capacitor reaching its maximum or minimum value, and as a second condition a fact that at the time of minimum load, the time of the reversal of the voltage polarity in the above-mentioned primary winding substantially coincides with the time of the oscillating voltage of the above-mentioned capacitor completing one cycle, the above-mentioned capacitor is set so that its capacitance satisfies simultaneously the above-mentioned first and second conditions, thereby making constant the load voltage in a minimum through maximum load current range. The above-mentioned configuration allows the load voltage to be made constant in a wide load current range with an inexpensive circuit configuration without providing the feedback control circuit, that is, without making complex the circuit. Therefore, a substantially-constant load voltage is supplied to a load whose load current largely varies or to plural kinds of loads whose load voltages are constant and load currents are different from each other.

This system may be configured such that in the system, instead of the above-mentioned second condition, taking as a second condition a fact that at the time of minimum load, the timing of the reversal of the voltage polarity in the above-mentioned primary winding substantially coincides with the timing of the oscillating voltage of the above-mentioned capacitor starting oscillation, and at the same time, the timing of the reversal of the voltage polarity in the above-mentioned primary winding substantially coincides with the timing of the oscillating voltage of the above-mentioned capacitor completing one cycle, the above-mentioned capacitor is set so that its capacitance satisfies simultaneously the above-mentioned first and second conditions. In this system, the circuit constant is set so as to satisfy a condition formula of $4 \cdot \pi \cdot f \cdot (L02\_EC2)^{1/2} = 1$ when the leakage inductance converted to the secondary side of the above-mentioned transformer is expressed as L02, the capacitance of the above-mentioned capacitor as C2, and the frequency of the above-mentioned high-frequency AC voltage as f. This allows the output voltage to be made constant for a load current equal to or less than the maximum value in the above-mentioned load current range. This system, in which a dummy load for flowing a current equal to or more than the above-mentioned minimum value even in the load current region smaller than the minimum value in the above-mentioned load current range is connected between the above-mentioned output terminals, can flow a current equal to or more than the above-mentioned minimum value even in the load current region smaller than the minimum value in the above-mentioned load current range. This system includes a drive circuit for supplying the above-mentioned high-frequency AC voltage to the above-mentioned primary winding, and in the above-mentioned drive circuit, the frequency of the above-mentioned high-frequency AC voltage changes automatically so that when the above-mentioned load current is within the above-mentioned load current range, the voltage supplied to a load is made constant. Hence, the load voltage is made constant in a wide load current range.

This system includes a drive circuit for supplying the above-mentioned high-frequency AC voltage to the above-mentioned primary winding, the above-mentioned drive circuit consisting of a resonance-type inverter. The above-mentioned drive circuit may be a partial resonance-type inverter having a resonating capacitor which is connected parallel to the above-mentioned primary winding and develops a resonance between the capacitor and the above-mentioned primary winding. This allows the load voltage to be made constant in a wide load current range while maintaining a soft switching. The above-mentioned drive circuit may be the one which includes a voltage resonance circuit by the above-mentioned primary winding and by a resonating capacitor connected parallel to the above-mentioned primary winding, and the voltage waveform of the above-mentioned high-frequency AC voltage exhibits a sinusoidal waveform. The above-mentioned drive circuit should be such that in a period when the on-time of a switching element switched in said drive circuit is constant, and a partial resonance develops, and at the same time, in at least one period of either the rising period or the falling period of the voltage waveform of the above-mentioned high-frequency AC voltage, at least one of either the time of said period or the voltage waveform of said period varies corresponding to the load current. This allows the load voltage to be made constant in a wide load current range while maintaining a soft switching.

The above-mentioned inverter can employ a half-bridge type one or a push-pull type one. This causes the utilizing efficiency of the transformer core to be improved. The above-mentioned inverter may be a self-excited one which includes a feedback winding and an auxiliary winding each magnetically coupled to the primary winding of the above-mentioned transformer, a voltage-drive type switching element given an input voltage the control end through the feedback winding, and a charging/discharging circuit connected between both ends of the auxiliary winding for controlling the above-mentioned input voltage, and when a charge voltage due to an induced voltage of the auxiliary winding reaches a specified value, lowers the above-mentioned input voltage to turn off the above-mentioned switching element. This causes the rising period and falling period of, and the waveform of the voltage to vary utilizing a change in the resonance state of the voltage of the primary winding developed in the off-time of the switching element corresponding to the load current, thereby allowing the load voltage to be made constant in a wide load current range. Even in a load current region smaller than the minimum value in the above-mentioned load current range, a resistance for flowing a current equal to or more than the above-mentioned minimum value is sufficient to be connected between output terminals connected with a load. This allows the output voltage to be automatically made constant in all load current ranges.

Furthermore, the non-contact electrical power transmission system according to the present invention comprises an inverter circuit including a transformer having a structure of the primary winding and the secondary winding whose voltage is induced by the primary winding being separable and detachable therebetween, a first capacitor connected to the above-mentioned secondary winding side for being matched with a load, a rectifier circuit for rectifying a voltage induced in the above-mentioned secondary winding, a current-smoothing reactor for smoothing an output current of the above-mentioned rectifier circuit, and an output terminal supplied with a smoothed output by the above-mentioned reactor and connected with the load, and in the system, an inductance value of the above-mentioned reactor is selected so that when the magnitude of the above-mentioned load is made changed, the load current value at the time when the output voltage of when the magnitude of the above-mentioned rectifier circuit varies from a discontinuous condition to a continuous condition is made smaller, whereby the rise of the above-mentioned output terminal voltage at the time when the above-mentioned load is no-load or minute load is controlled.

A dummy load capable of flowing at all time a load current value at the time when the output current of the above-mentioned rectifier circuit varies from a discontinuous condition to a continuous condition may be connected to the output terminal. A second capacitor is connected parallel to the above-mentioned current-smoothing reactor, and an electrostatic capacitance of the above-mentioned second capacitor is set so that the AC voltage component of the voltage at the input side of the above-mentioned current-smoothing reactor exhibits a sinusoidal waveform. This allows the rise of the output terminal voltage to be controlled even at the time of no-load/minute load and a loss to be made lower even a case of connecting a dummy load.

In this system, the electrostatic capacitance of the above-mentioned second capacitor is set so that when the load is increase gradually from no-load, the amplitude of the AC voltage component of the voltage at the input side of the above-mentioned current-smoothing reactor becomes equal to that of the output terminal voltage. The electrostatic capacitance of the above-mentioned second capacitor may be set so that when the load is increased gradually from no-load, the load current value at the time when the zero period in which the output current of the above-mentioned rectifier circuit is zero dissipates becomes smallest. A resonance frequency determined by the inductance value of the above-mentioned current-smoothing reactor and by the electrostatic capacitance of the second capacitor is equal to two times the frequency of the voltage applied to the primary winding. A resonance frequency determined by the electrostatic capacitance of the above-mentioned first capacitor and by the leakage inductance value converted to the secondary side the separable and detachable transformer may be equal to two times the frequency of the voltage applied to the primary winding. The above-mentioned secondary winding includes a center tap, and the rectifier circuit consists of two diodes, and connects one end of the above-mentioned each diode in series and in opposite direction to each other to both output ends (not to the center tap) of the above-mentioned secondary winding, thereby configuring a full-wave rectifier circuit interconnecting the other ends of the above-mentioned each diode. When the magnitude of the load is made changed by making larger the inductance value of the above-mentioned current-smoothing reactor, the load current value at the time when the output current of the above-mentioned rectifier circuit varies from a discontinuous condition to a continuous condition is made smaller, thereby controlling the rise of the output terminal voltage at the time of the load being no-load or minute load.

BRIEF DESCRIPTION OF THE DRAWINGS

FIG. 4 is a graph illustrating the operation of the circuit of FIG. 1.

FIG. 5 is a graph illustrating the operation of the circuit of FIG. 1.

FIG. 6 is a graph illustrating the operation of the circuit of FIG. 1.

FIG. 20 is a graph illustrating the operation of the circuit of FIG. 18.

FIG. 21 is a graph illustrating the operation of the circuit of FIG. 18.

DETAILED DESCRIPTION OF THE PREFERRED EMBODIMENTS

FIRST EMBODIMENT

Figure 1:
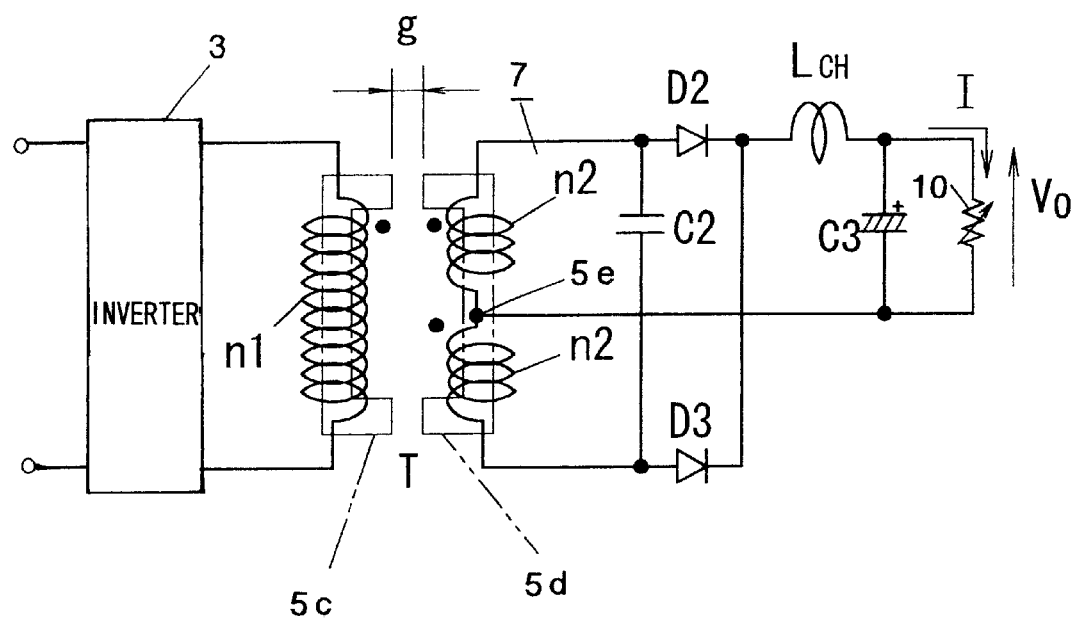
FIG. 1 is a circuit diagram of the system in accordance with a first embodiment of the present invention.
Figure 42A:
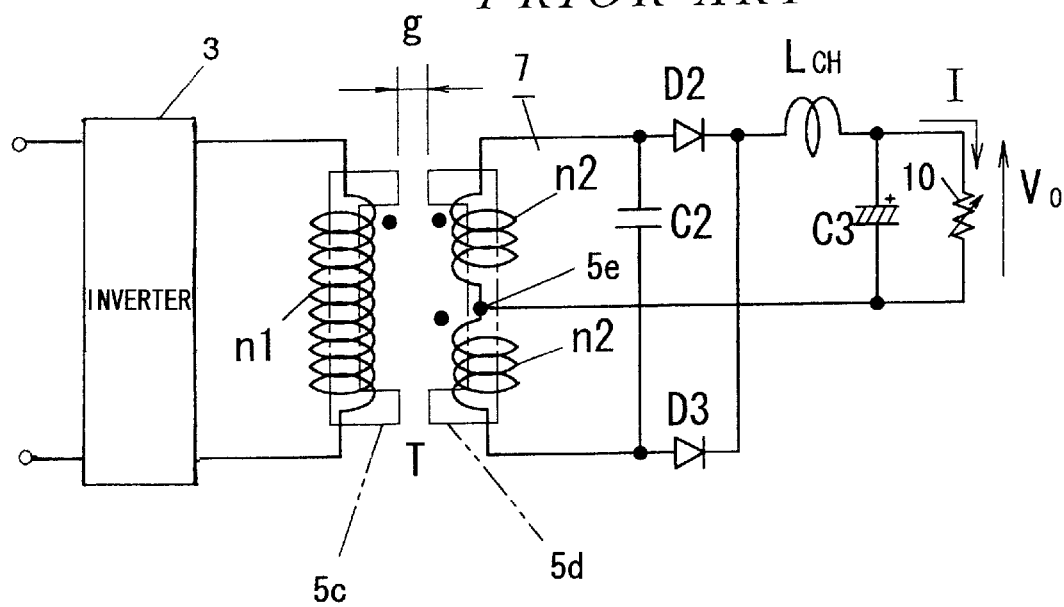
FIG. 42(A) is another prior art circuit diagram.

Referring to FIG. 1, a circuit of the non-contact electrical power transmission system in accordance with an embodiment of the present invention has a configuration similar to the prior art circuit of the above-mentioned FIG. 42(A), except for the values of circuit constants. A rectifier circuit 7 for full-wave rectifying the output of a secondary winding n2 is connected to the secondary side of a separable transformer T. A choke coil LCH is connected in series with a load 10, consisting of a variable resistance, is connected between the output ends of the rectifier circuit 7. A smoothing capacitor C3 is connected parallel with the load 10. A matching capacitor C2 is connected in parallel with the secondary winding n2 of the transformer T. A primary winding n1 of the transformer T is supplied with a high-frequency AC voltage from an inverter 3 which functions as a drive circuit. One terminal of the full-wave rectifier circuit 7 is connected to a center tap 5e on the secondary winding n2 of the transformer T. The anodes of diodes D2 and D3 are connected to the respective ends of the secondary winding n2 of the transformer T. The cathodes of the diodes D2, D3 are connected to each other. The transformer T has the same configuration as described in FIG. 40.

Figure 44:
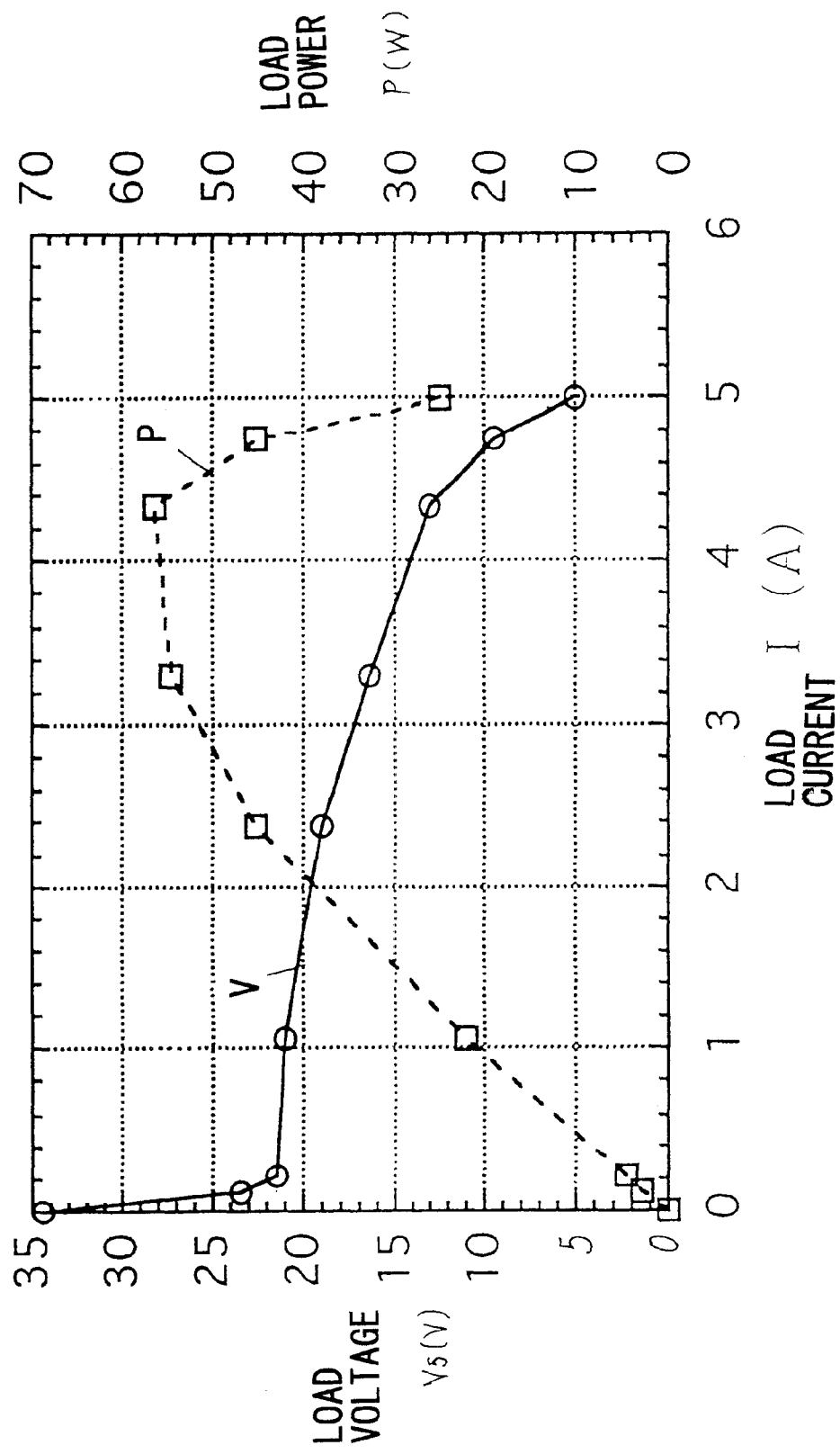
FIG. 44 is a characteristics illustrating graph of the circuit of FIG. 42(A).

The inventor of the present invention discovered a fact that in measuring output characteristics such as load voltage (output voltage)/load current characteristics and load power/load current characteristics as shown in the above-mentioned FIG. 44, by changing variously the resistance value of the load 10 in the circuit shown in FIG. 42(A), there is a region in which changing the capacitance of the matching capacitor C2 causes the output characteristics to exhibit various shapes, but by selecting appropriately the capacitance of the matching capacitor C2, fluctuations in the load voltage (output voltage) with respect to a change of the load current is reduced. (That is, there is a region in which the above-mentioned voltage change rate is reduced). Examples of such output characteristics are shown in respective FIG. 2 and FIG. 3.

Figure 2:
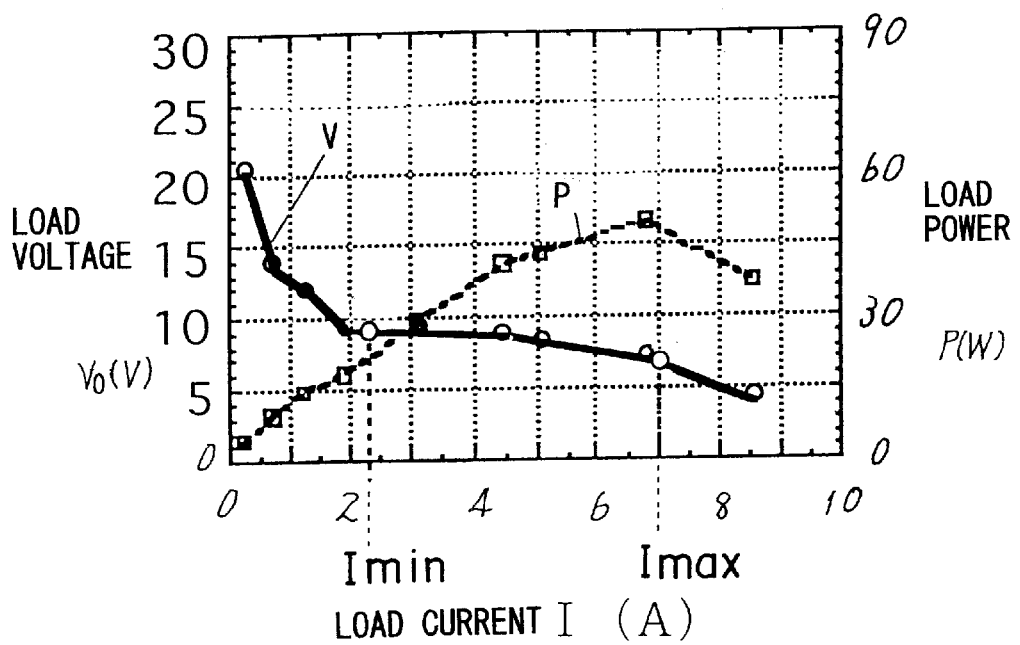
FIG. 2 is a characteristic output graph of the circuit of FIG. 1.
Figure 3:
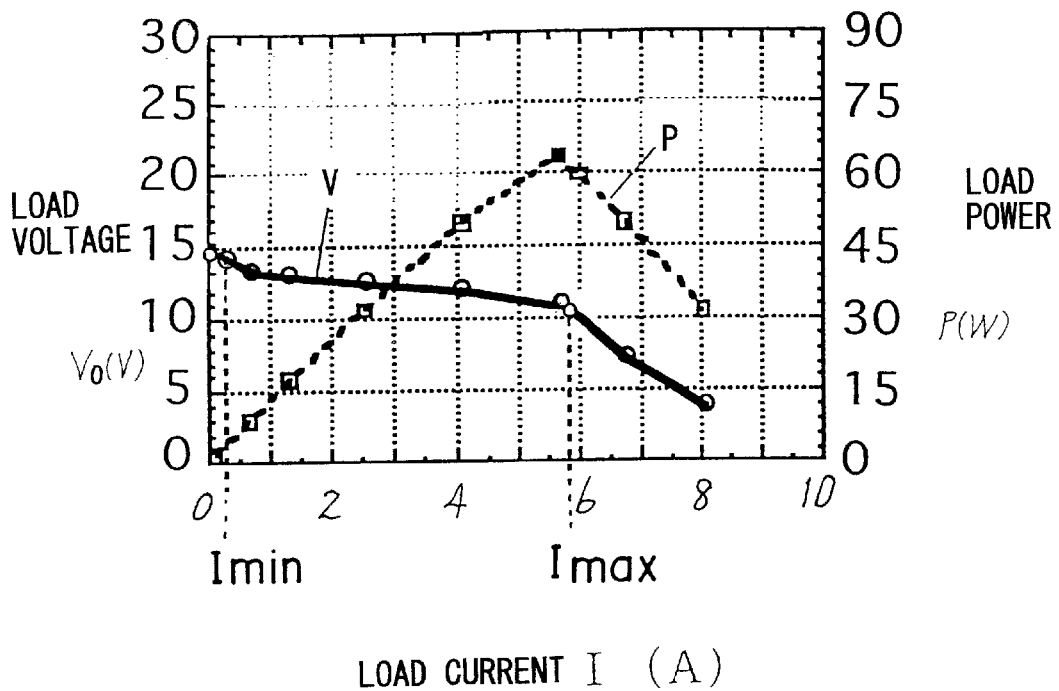
FIG. 3 is a characteristic output graph of the circuit of FIG. 1.
Figure 39A:
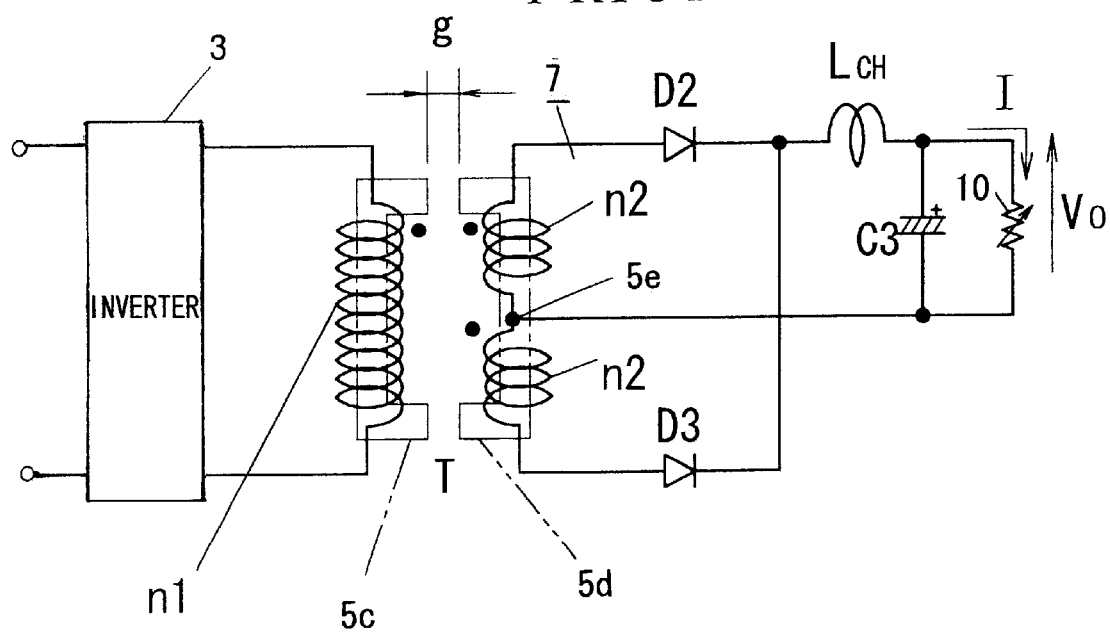
FIG. 39(A) is a prior art circuit diagram.
Figure 39B:
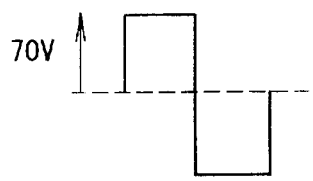
FIG. 39(B) is a waveform chart of a high-frequency AC voltage applied to the circuit of FIG. 39(A).

FIG. 2 and FIG. 3 each is a load voltage/load current characteristic graph, and also an output characteristic graph obtained by applying a square-wave-shaped high-frequency AC voltage with a maximum amplitude 70 V and a frequency approximately 97 kHz as shown in the above-mentioned FIG. 39(B) to the primary winding n1 and by changing variously the resistance value of the load 10 taking the inductance value of the choke coil LCH as 100 μH, the capacitance of the capacitor C3 connected in parallel with the load 10 as 100 μF, and the gap g between the primary side core 5c of the transformer T and the secondary side core 5d as 2 mm in the circuit shown in FIG. 42(A). In FIG. 2 and FIG. 3, the axis of the abscissa is for a load current, the axis of ordinate on the left side for load voltage V0. The axis of the ordinate on the right side indicates load power P, the curve V indicates the load voltage and the curve P indicates the load power.

It will be understood from FIG. 2 and FIG. 3 that there exists a load current range over which a relatively small voltage change rate (changed width of load voltage V0/changed width of load current I) occurs compared to the output characteristics of the above-mentioned FIG. 44. In FIG. 2 and FIG. 3, the maximum value (hereinafter referred to the maximum load current value) of the load current I in the load current range having a relatively small above-mentioned voltage change rate is expressed as an Imax, and the minimum value (hereinafter referred to the minimum load current value) of the load current I in said load current range as an Imin. The voltage change rate in a load current range from the minimum load current value Imin to the maximum load current value Imax is about 0.6/A. It will be understood that on the contrary, in the load voltage/load current characteristics of the above-mentioned FIG. 44, the voltage change rate in the load current range of the load current values 1 through 4 A is about 2.5 V/A, so that the load voltage/load current characteristics shown in FIG. 2 and FIG. 3 is smaller in voltage change rate compared to the load voltage/load current characteristics shown in FIG. 44. That is, the load voltage V0 is substantially stable in the load current range from the minimum load current value Imin to the maximum load current value Imax, thereby allowing the load voltage in the load current range to remain substantially constant.

The inventor of the present invention has further discovered the fact that, when the load current range in which the load voltage V0 becomes substantially stable in the load voltage/load current characteristics are obtained, there are common features as shown below which will be explained with reference to FIG. 4 through FIG. 6. FIG. 4 through FIG. 6 are graphs illustrating the operation waveform of each part in the equivalent circuit converted to the secondary side of the circuit of FIG. 42(A) shown in FIG. 43. The symbols (a)–(l) in these figures have the following significance:

(a) indicates a voltage E1S across the primary winding n1;
(b) indicates a voltage E3S across a power source part 1a;
(c) indicates a voltage VC2 across the matching capacitor C2;
(d) indicates a voltage VL03 across the inductance L03;
(e) indicates a voltage VL04 across the inductance L04;
(f) indicates a voltage EL across output ends of the rectifier circuit 7;
(g) indicates a current IL03 flowing to the inductance L03;
(h) indicates a current IL04 flowing to the inductance L04;
(i) indicates a current IC2 flowing to the matching capacitor C2;
(j) indicates a current Id2 flowing to the diode D2;
(k) indicates a current Id3 flowing to the diode D3;
(l) indicates a load current I flowing to the load 10.

First, in a circuit condition in which the magnitude of the load current I is the maximum load current value Imax, the polarity reverse time (for example, times t1, t3) of the voltage E1S across the primary winding n1, as shown in FIG. 4(a), substantially coincides with the time (times t1, t3) when the voltage VC2 across the matching capacitor C2 reaches its maximum and minimum values as shown in FIG. 4(c). The fact that this condition is a load matching condition in non-contact electrical power transmission has been already proposed in U.S. Pat. Ser. No. 09/407761.

On the one hand, in a circuit condition in which the magnitude of the load current I is the minimum load current value Imin, at the time when the voltage VC2 across the matching capacitor C2 completes charging in its charging/discharging as shown in FIG. 5(c), that is, at the times of t1, t3 when in the charging/discharging of the matching capacitor C2, the voltage VC2 across the matching capacitor C2 starts from an approximate zero volt condition the charging of the matching capacitor C2, reaches its maximum value or its minimum value, starts the discharging of the matching capacitor C2, then returns back to the approximate zero volt condition, the polarity of the voltage E1S across the primary winding n1 (and the induced voltage E3S converted to the secondary side) reverses. That is, when the magnitude of the load current I is the minimum load current value Imin, the time for the polarity reverse of the voltage E1S across the primary winding n1 substantially coincides with the time when the discharging of the matching capacitor C2 completes the charging/discharging of the matching capacitor C2. In other words, the time when the oscillation waveform of the voltage VC2 across the matching capacitor C2 completes one cycle. One-cycle completion means that the voltage VC2 across the matching capacitor C2 starts the oscillation, passes through the maximum value or the minimum value once, then returns again back to the approximate zero volt condition.

Also, the operation waveform at the time when the magnitude of the load current I exhibits an arbitrary current value from the above-mentioned minimum load current value Imin to the maximum load current value Imax is an intermediate waveform between the waveform satisfying the condition in which the load current I exhibits the maximum load current value Imax and the waveform satisfying the condition in which the load current I exhibits the minimum load current value Imin. Meanwhile, making the load voltage V0 constant is usually required for a region from a no-load time to a full-load time of a load device, so that it is desirable to have output characteristics as shown in FIG. 3 and to set the load current range from the minimum load current value Imin to the maximum load current value Imax. In this case, in a circuit condition in which the load current value I exhibits a current value close to the minimum load current value Imin, that is, in a condition close to the no-load time, assuming that the waveform of a high-frequency AC voltage supplied to the primary winding n1 is a square wave, it has been discovered that the operation waveform of each part has features as shown in FIGS. 6(a)–6(l).

The features exist in that the time when the oscillation waveform of the voltage VC2 across the matching capacitor C2 starts oscillation as shown in FIG. 6(c) substantially coincides with the time (for example, times t1, t3) of the polarity reverse of the voltage E1S across the primary winding n1 as shown in FIG. 6(a). The time of the polarity reverse of the voltage E1S across the primary winding n1 as shown in FIG. 6(a), the current IC2 flowing through the matching capacitor C2 becomes approximately zero as shown in FIG. 6(i). If the time of starting of the oscillation of the voltage VC2 across the matching capacitor C2 coincides only with the time of the polarity reverse of the voltage E1S across the primary winding n1, various-shaped output characteristics other than those shown in FIG. 3 are obtained, and however. The only case exists where at the time of the polarity reverse of the voltage E1S across the primary winding n1, the current IC2 of the matching capacitor C2 also becomes approximately zero, and only the time of having these features, the load voltage V0 is made constant (stabilized) in a load current range from the minimum load current value Imin at the time of approximately no-load to the maximum load current value Imax as shown in FIG. 3.

It will be understood that a circuit condition satisfying such features exists in a case where expressing the leakage inductance converted to the secondary side of the transformer T as L02, the frequency (drive frequency) of the high-frequency AC voltage supplied to the primary winding n1 of the transformer T as f, and the capacitance of the matching capacitor C2 as C2, the following formula (1) is satisfied:

$$4\cdot\pi\cdot f\cdot(L02\cdot C2)^{1/2}=1 \quad (1)$$

Figure 43:
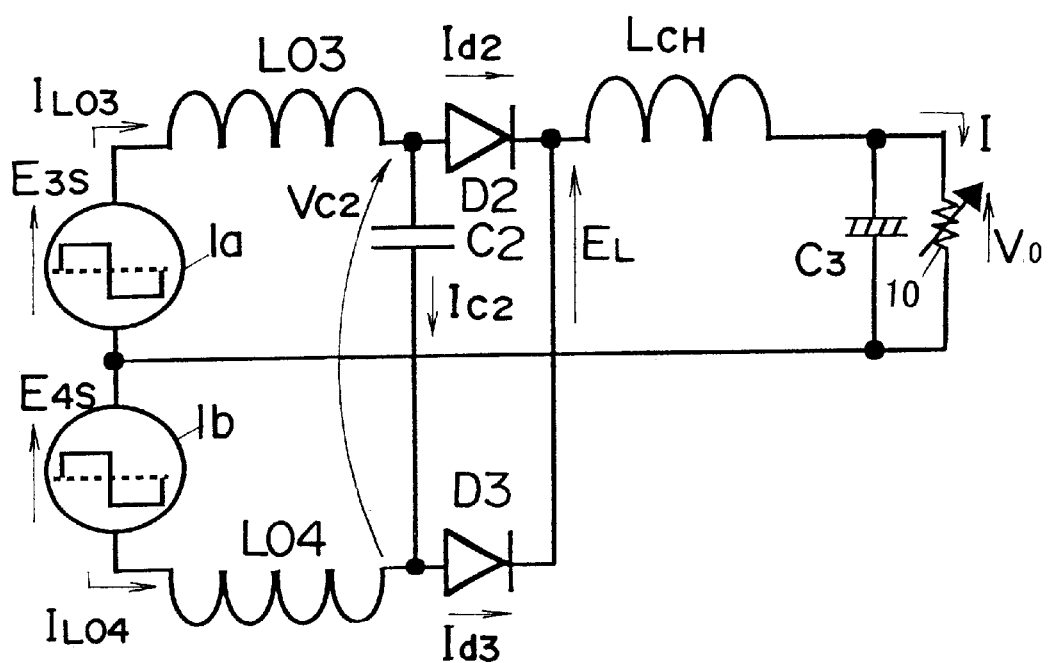
FIG. 43 is an equivalent circuit diagram of the circuit of FIG. 42(A).

Now, the leakage inductance L02 is a sum of the inductance value of the leakage inductance L03 in the equivalent circuit shown in FIG. 43 and the inductance value of the leakage inductance L04, so that the capacitance of the matching capacitor C2 to obtain characteristics as shown in FIG. 3 is determined by the following formula (2):

$$C2=(1/L02)\cdot\{1/(4\cdot\pi\cdot f)\}^2- \quad (2)$$

Also where the center tap 5e is provided on the secondary winding n2 to perform rectification as mentioned above, the leakage inductance converted to the secondary side is indicated to be divided into twice the leakage inductance L03 and the leakage inductance L04 as shown in FIG. 43. Where the secondary winging n2 of the transformer T is uniformly wrapped with respect to the center tap 5e, the inductance values of both the inductances L03, L04 are substantially equal to each other. Thus, the capacitance of the matching capacitor C2 to obtain the output characteristics as shown in FIG. 3 are determined by the following formula (3):

$$C2=(1/L03)\cdot\{1/(4\cdot\pi\cdot f)\}^2- \quad (3)$$

Figure 40:
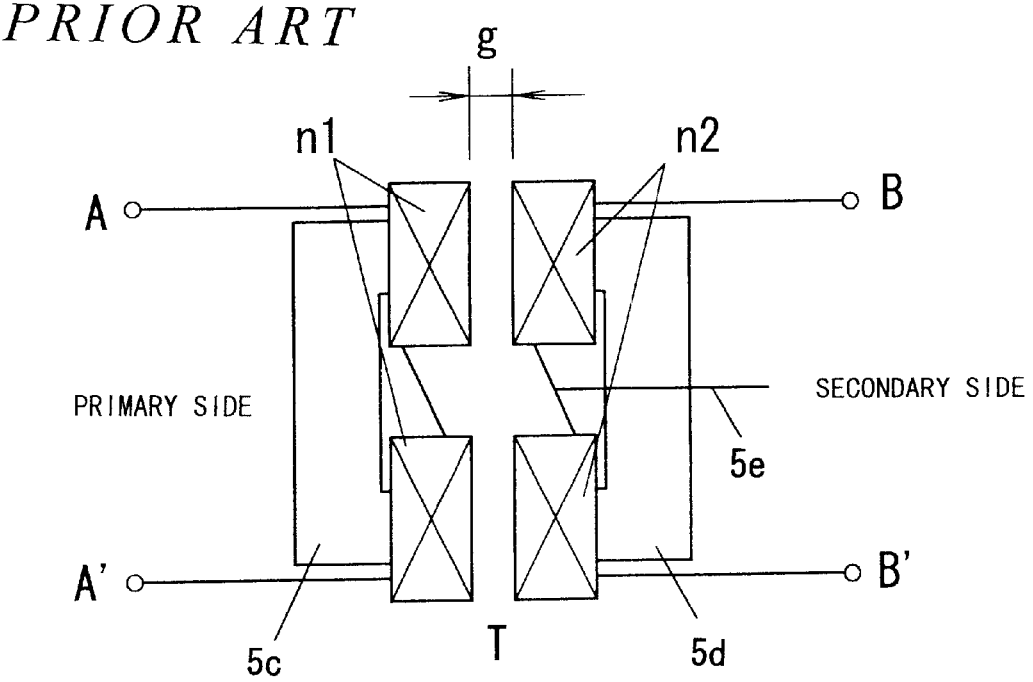
FIG. 40 is a schematic configuration diagram of a transformer of the circuit of FIG. 39(A).
Figure 41:
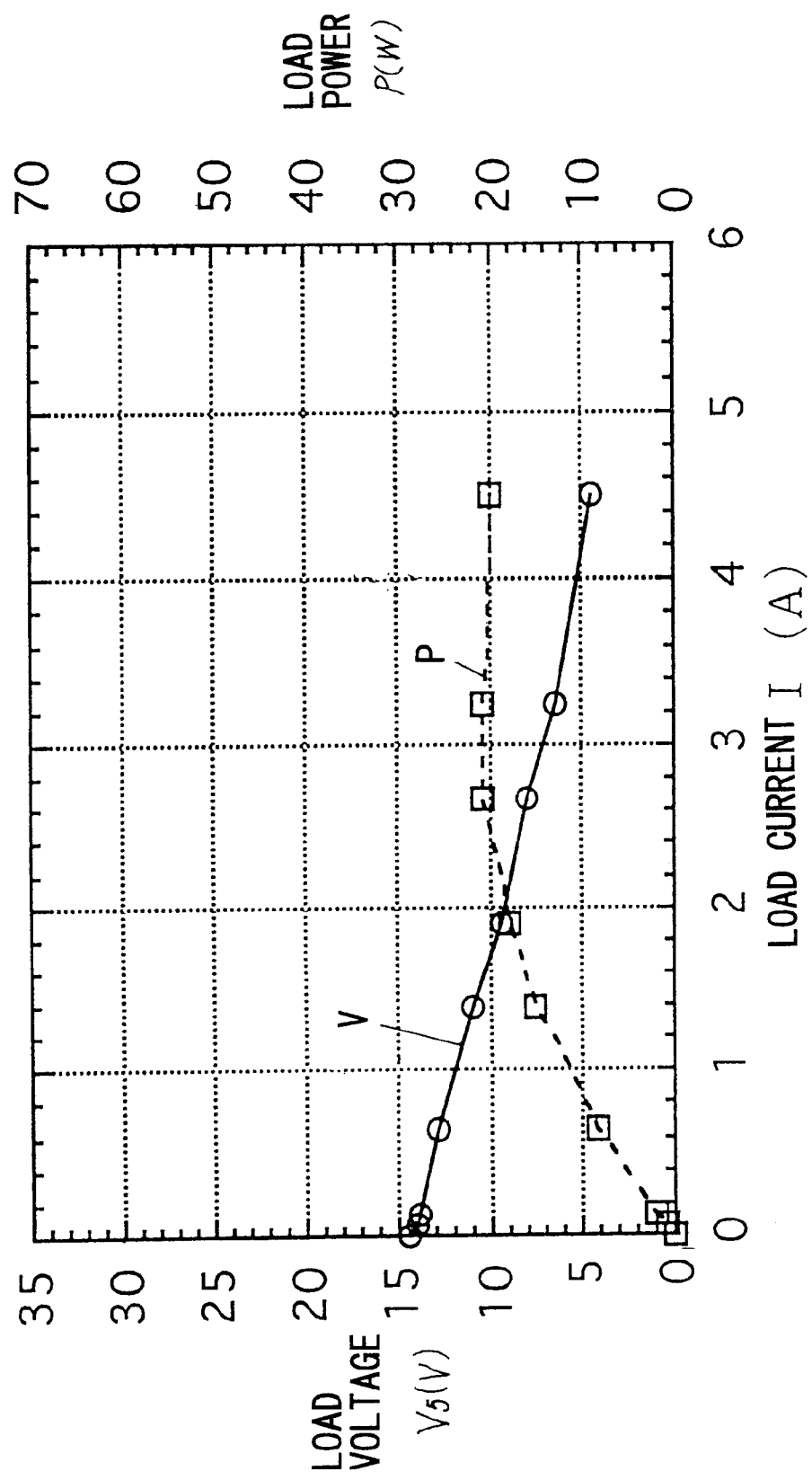
FIG. 41 is a characteristics illustrating graph of the circuit of FIG. 39(A).

Further, the inductance value of the leakage inductance L02 is obtained by shorting between the winding terminals A/A' of the primary winding n1 and measuring the inductance value when viewed from the winding terminals B/B' of the secondary winding n2 in the configuration of the transformer T shown in FIG. 40. Also, where the voltage waveform of a high-frequency AC voltage supplied to the primary winding n1 cannot be assumed to be a square wave, for example, even with a trapezoidal-shaped voltage waveform, the output characteristics as shown in FIG. 3 is obtained by setting circuit constants to satisfy the relationship of formulas (1) through (3). However, in this case, at the time of the polarity reverse of the voltage E1S across the primary winding n1, the current IC2 of the matching capacitor C2 is not necessarily required to be approximately zero.

Concluding the above discussion, the non-contact electrical power transmission system of this embodiment, which contains the same type of components as the prior art configuration shown in FIG. 42(A), has features in that taking as a first condition a fact that the time of the polarity reversal of the voltage E1S across the primary winding n1 of the transformer T substantially coincides with the time when the voltage VC2 across the matching capacitor C2 reaches its maximum and minimum values to specify the maximum load current value Imax of the maximum value in a load current range supplied to the load 10 in the circuit shown in FIG. 1, and as a second condition a fact that the time of the polarity reversal of the voltage E1S across the primary winding n1 substantially coincides with the time of the completion of the discharging of the matching capacitor C2 to specify the minimum load current value Imin of the minimum value in a load current range supplied to the load 10, the capacitance of the matching capacitor C2 is set to satisfy simultaneously the above-mentioned first and second conditions.

In the non-contact electrical power transmission system of this embodiment, compared to the configuration of the prior art non-contact electrical power transmission system shown in FIG. 42(A), without providing the above-mentioned feedback control circuit or stabilizing power source circuit, that is, without making a complex the circuit, and with an inexpensive. circuit configuration, the load voltage V0 is made constant over a wide load current I, so that a substantially constant load voltage V0 is supplied to a load 10 over a widely changing load current I, or to various kinds of loads 10 in which the load voltages V0 are constant and the load currents I different from one another.

Now, expressing the leakage inductance converted to the secondary side of the transformer T as L02, the capacitance of the matching capacitor C2 as C2, and the frequency of the above-mentioned high-frequency AC voltage as f, the circuit constants are set to satisfy the following condition formula:

$$4\cdot\pi\cdot f\cdot(L02\cdot C2)^{1/2}=1$$

so that for the load current I equal to or less than the maximum load current value Imax, the load voltage V0 (output voltage) is made constant.

Also, in the circuit shown in FIG. 1, in the no-load region, current barely flows to the load 10, so that a larger load voltage V0 region may develop as shown in FIG. 44. To solve this problem, it suffices to provide a dummy resistance between output terminals connected with the load 10 so that even in no-load condition, the minimum load current value Imin can flow. In other words, even in a region of a load current smaller than the minimum load current value Imin, connecting a dummy load for drawing a current equal to or larger than the minimum load current value Imin between the output terminals connected with the load 10 allows a current equal to or larger than the minimum load current value Imin to flow even in a region of actual load current that is smaller than the minimum load current value Imin.

SECOND EMBODIMENT

Figure 7A:
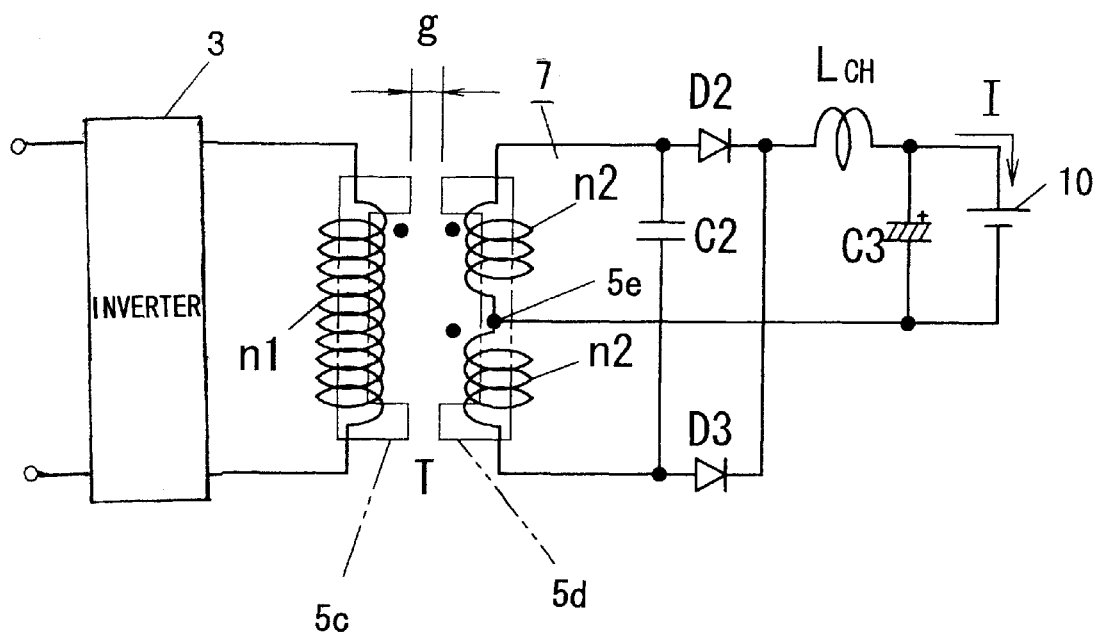
FIG. 7(A) is a circuit diagram of the system in accordance with a second embodiment of the present invention.
Figure 8:
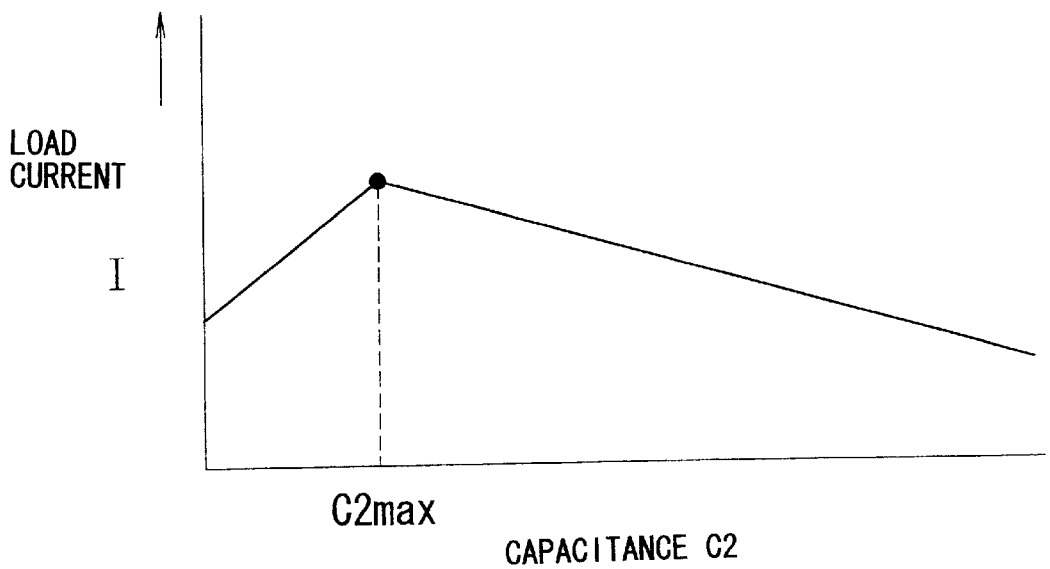
FIG. 8 is a graph illustrating a relationship between a capacitance of capacitors connected parallel to a secondary winding of a transformer and a load current.

FIG. 7(A) shows a circuit of the non-contact electrical power transmission system in accordance with this embodiment. This non-contact electrical power transmission system has the same configuration as that of the first embodiment shown FIG. 1. However, the circuit in FIG. 7(A) differs from the circuit in FIG. 1 in that the circuit in FIG. 7(A) uses a rechargeable battery as a load 10 connected between output terminals and is utilized as charging device for recharging the rechargeable battery. Components similar to those in the first embodiment are accorded the same reference numerals to omit their explanation. Where a constant-voltage load such as the rechargeable battery is connected as a load 10, the characteristics expressing the relationship between the capacitance of the matching capacitor C2 connected parallel to the secondary winding n2 and the load current I has a trend as shown in FIG. 8. In the characteristics, the capacitance of the matching capacitor C2 when the load current I reaches a maximum value by changing the capacitance of the matching capacitor C2 is referred to as C2max. In a word, when the capacitance of the matching capacitor C2 is made equal to C2max, the maximum value of the load current (charge current) I is obtained. When the capacitance of the matching capacitor C2 is shifted from C2max, the charge current I is decreased.

Figure 7B:
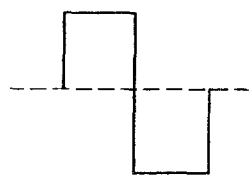
FIG. 7(B) is a waveform chart of a high-frequency AC voltage.
Figure 9:
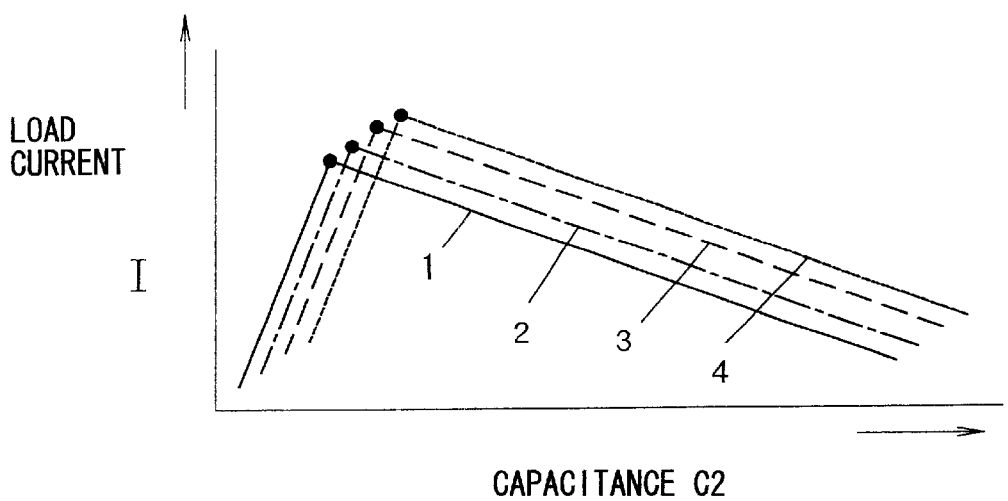
FIG. 9 is a graph illustrating the relationship.
Figure 10:
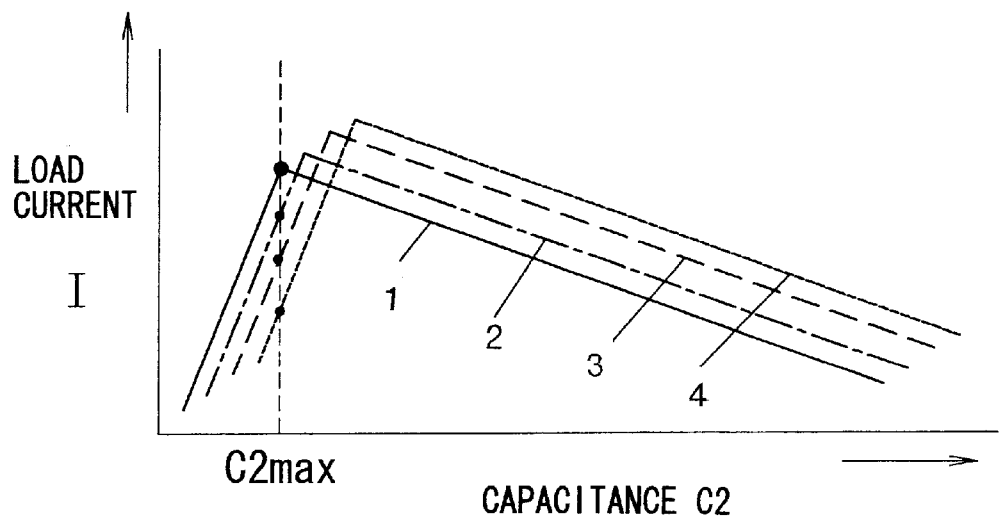
FIG. 10 is a graph illustrating the relationship.
Figure 11:
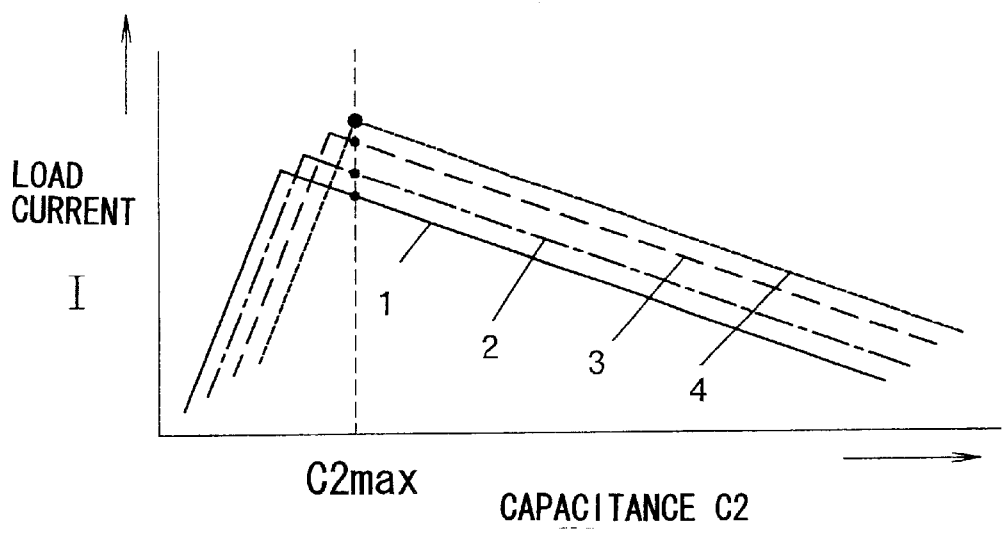
FIG. 11 is a graph illustrating the relationship.

In the circuit shown in FIG. 7(A), changing the frequency (hereinafter referred to as the drive frequency) of the high-frequency square-wave AC voltage supplied to the primary winding n1 as shown in FIG. 7(B) causes the load current characteristics for the capacitance of the matching capacitor C2 to vary in a fashion, for example, shown with lines 1, 2, 3, 4 in FIG. 9, in which the drive frequency is reduced in the order of 1, 2, and 3, followed by 4. Changing the drive frequency causes C2max to vary. The higher the drive frequency, the lower the capacitance of C2max. Therefore, as shown in FIG. 10, when the capacitance of the matching capacitor C2 is selected to become C2max in a condition "1" with higher drive frequency, changing the drive frequency from a lower to a higher value increases the charge current I to the rechargeable battery of the load 10. Also, as shown in FIG. 11, when the capacitance of the matching capacitor C2 is C2max in a condition "4" with lower drive frequency, changing the drive frequency from lower to higher value decreases the charge current I to the rechargeable battery of the load 10.

Figure 42B:
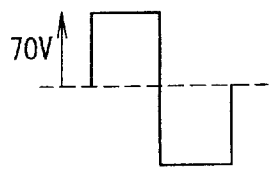
FIG. 42(B) is a waveform chart of a high-frequency AC voltage applied to the circuit of FIG. 42(B).

Although the above-mentioned characteristics are those where the load voltage V0 is constant, the characteristics indicate that when a load is used in which an increase in load current I causes a decrease in load voltage V0, such as the resistance of the load 10 as shown in FIG. 42, or the load provided with a smoothing capacitor, changing the drive frequency corresponding to a change of the load current I keeps the load voltage V0 at approximately a constant value.

More specifically, when frequency control is performed in a manner such that the drive frequency is highest at full load (maximum load), and the drive frequency is lowest in a no-load condition, setting the capacitance of the matching capacitor C2 at C2max so as to provide a desired load voltage V0 stable in the full load condition, and lowering the drive frequency as the load 10 becomes lighter allows the load voltage V0 to remain approximately constant over a wide load range from no-load to full load. Now, the capacitance C2max of matching capacitor C2 is set according to the self-inductance of the primary winding n1, the self-inductance of the secondary winding n2, the mutual inductance between the primary winding n1 and the secondary winding n2, and the highest drive frequency. Therefore, the drive frequency must be automatically changed so as to correspond to the load current I.

Figure 12A:
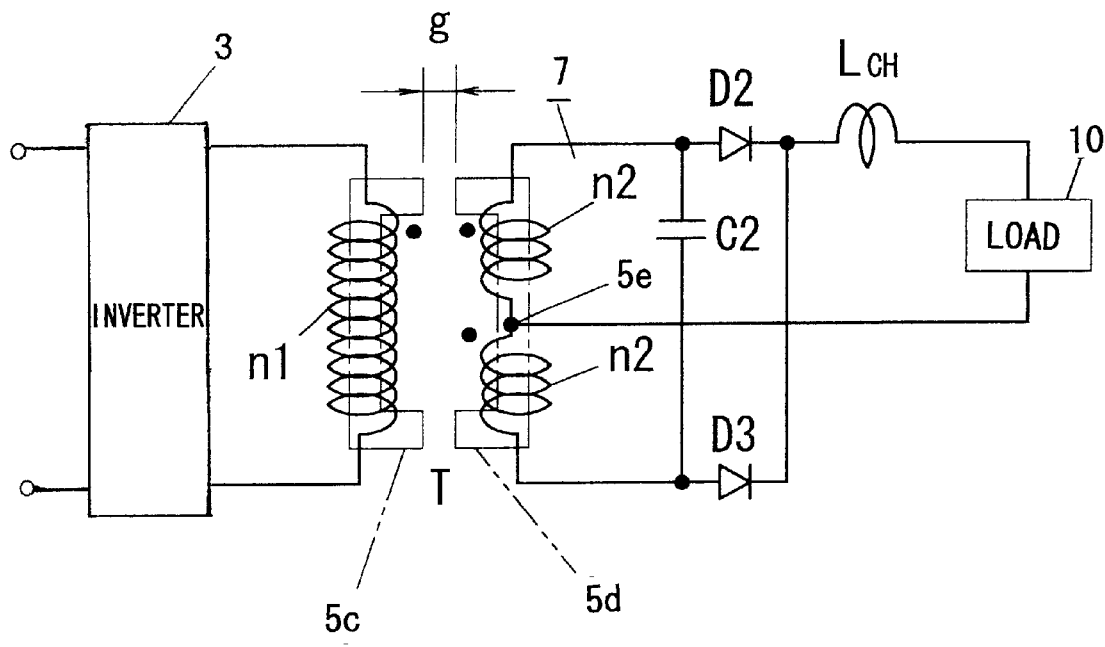
FIG. 12(A) is a circuit diagram having a configuration similar to that of the first embodiment.
Figure 12B:
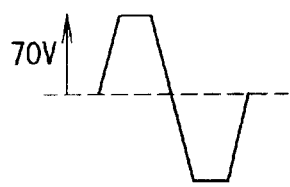
FIG. 12(B), FIG. 12(C) are waveform charts of a high-frequency AC voltage.
Figure 12C:
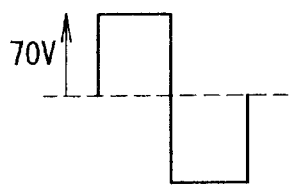

Also, generally, when the load voltage V0 is constant, the magnitude of the voltage amplitude of the primary winding n1 is proportional to the load current I. Therefore, as a method of making constant (stabilizing) the load voltage (output voltage), there is devised a method of controlling the voltage amplitude of the input voltage (high-frequency AC voltage) of the primary winding n1 depending on the change of the load voltage V0 due to the change of load current I. As a method embodying it, there is a method with which, in a circuit as shown in FIG. 12(A), the voltage waveform of the high-frequency AC voltage supplied to the primary winding n1 of the transformer T changed from the square-wave voltage waveform as shown in FIG. 12(C) to the trapezoidal-wave-shaped voltage waveform as shown in FIG. 12(B). Although not shown, a sinusoidal voltage waveform could be used. Here, changing the voltage waveform means changing the inclination of the high-frequency AC voltage at its rising time and falling time.

Figure 13:
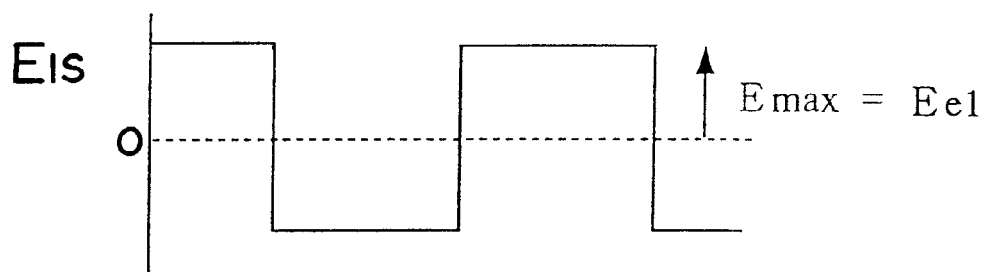
FIG. 13 is a chart illustrating the operation of the circuit of FIG. 12(A).
Figure 14:
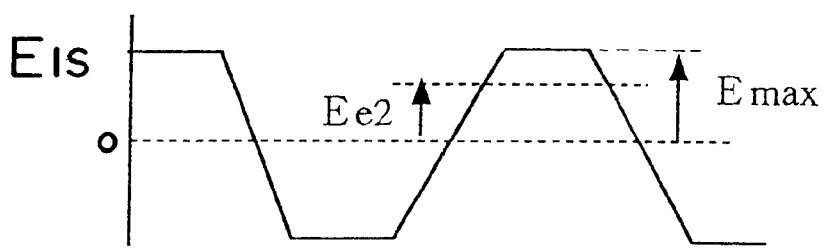
FIG. 14 is a chart illustrating the operation of the circuit of FIG. 12(A).

This utilizes voltage properties in which like the voltage E1S (high-frequency AC voltage) shown in FIGS. 13 and 14, even when the maximum amplitude Emax is same, the voltage waveform varies from the square wave to the trapezoidal wave, and the smaller the inclination of rising and falling, the smaller the equivalent voltage average amplitude (equivalent amplitude voltage) becomes. Here, the voltage average amplitude Ee1 of the square wave shown in FIG. 13 is equal to the maximum amplitude Emax, and the voltage average amplitude Ee2 of the trapezoidal wave shown in FIG. 14 is smaller than the maximum amplitude,Emax. When the load current I is small, the input voltage of the primary winding n1 is made the trapezoidal wave shape to make smaller the equivalent voltage amplitude applied to the primary winding n1, thereby restraining the rise in the load voltage V0. As the load current I becomes larger, the input voltage is made close to the square wave shape to make larger the equivalent voltage amplitude applied to the primary winding n1, thereby restraining the drop of the load voltage V0, whereby the load voltage V0 is made constant (stabilized) in a wide load current I range. Only the equivalent voltage amplitude is required to be changed without changing the maximum amplitude, so that the waveform to be changed from the square wave is not limited to the trapezoidal wave. This commercial application requires means of changing automatically the waveform corresponding to the load current I, thereby controlling automatically the equivalent voltage amplitude of the high-frequency AC voltage applied to the primary winding n1.

Figure 15:
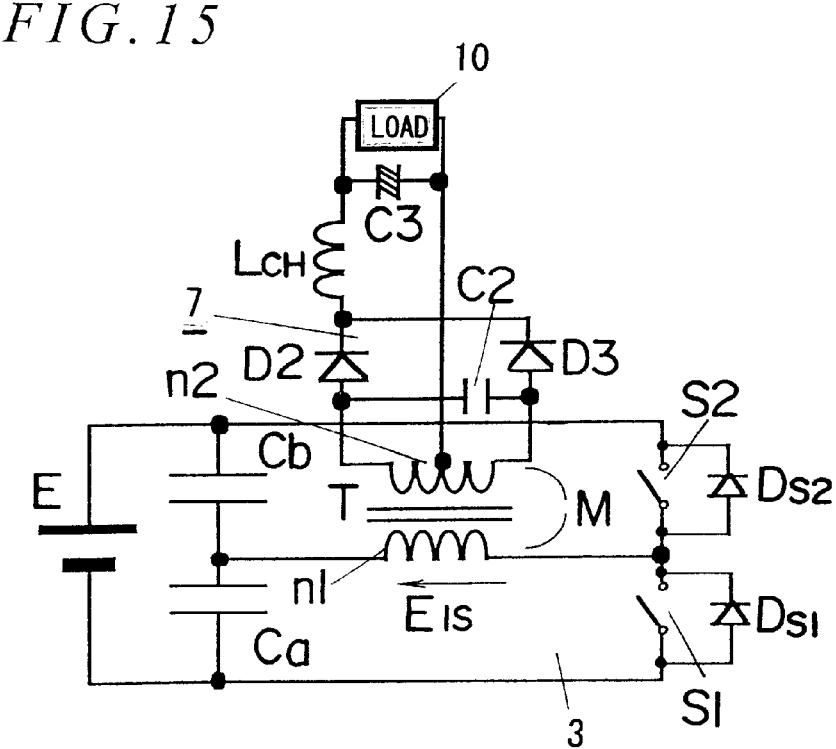
FIG. 15 is a circuit diagram including a drive circuit of a system in accordance with an embodiment of the present invention.

There will be explained hereinafter a non-contact electrical power transmission system capable of changing automatically the drive frequency and the voltage waveform of the high-frequency AC voltage corresponding to the load current I. FIG. 15 is an example in which a drive circuit 3 for supplying the high-frequency AC voltage to the primary winding n1 of the transformer T is configured as a half-bridge type inverter. Components similar to those in the first embodiment are accorded the same references. This non-contact electrical power transmission system includes the transformer T whose primary winding n1 and secondary winding n2 are separable therebetween, a DC power source E, a drive circuit 3 consisting of the half-bridge type inverter for converting the voltage of the DC power source E connected between the output terminals of the DC power source E to the high-frequency AC voltage to supply the voltage to the primary winding n1 of the transformer T, the matching capacitor C2 connected in parallel with the secondary winding n2 of the transformer T. The rectifier circuit 7 rectifies the voltage generated in the secondary winding n2 of the transformer T and supplies the rectified voltage to the load 10. The choke coil LCH is connected between the rectifier circuit 7 and the load 10. The capacitor C3 is connected in parallel with the load 10.

The drive circuit 3 includes series circuit of a pair of capacitors Ca, Cb and a series circuit of switching elements S1, S2 consisting of a pair of power MOSFETs. The series combination of the capacitors Ca and Cb is connected in parallel with the series combination of the switching elements S1 and S2 between the output terminals of the DC power source E. The primary winding n1 of the transformer T is connected between the junction of the capacitors Ca, Cb and the junction of the switching elements S1, S2. Although circulating diodes DS1, DS2 connected reversely parallel to the switching elements S1, S2 consist of body diodes of the MOSFETs of each switching elements S1, S2, these diodes DS1, DS2 may be provided separately. The DC power source E is obtained, for example, by smoothing a commercial power source.

This drive circuit 3 applies a square-wave high-frequency AC voltage to the primary winding n1 of the transformer T by alternately turning on and turning off the switching elements S1, S2. A conventional control circuit (not shown) controls the on and off conditions of the switching elements S1 and S2. The rectifier circuit 7 is a well-known full-wave rectifier circuit, in which a center tap is provided on the secondary winding n2 of the transformer T. The ends of the secondary winding n2 are connected to the anodes of the diodes D2, D3. The cathodes of the diodes D2, D3 are connected to each other. The above-mentioned choke coil LCH is connected between the mutual connecting point of the diodes D2, D3 and one end of the load 10. The center tap is connected to the other end of the load 10. Although the choke coil LCH is required to make the load current I continuous and smooth, the smoothing capacitor C3 may not necessarily be required.

Figure 16:
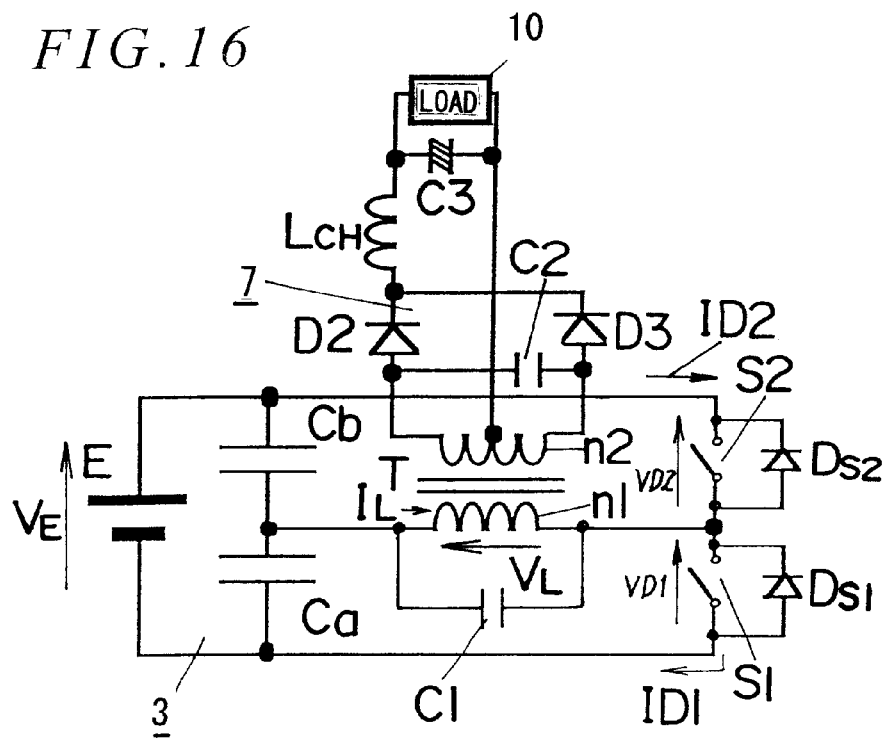
FIG. 16 is a circuit diagram similar to the above circuit.
Figure 17:
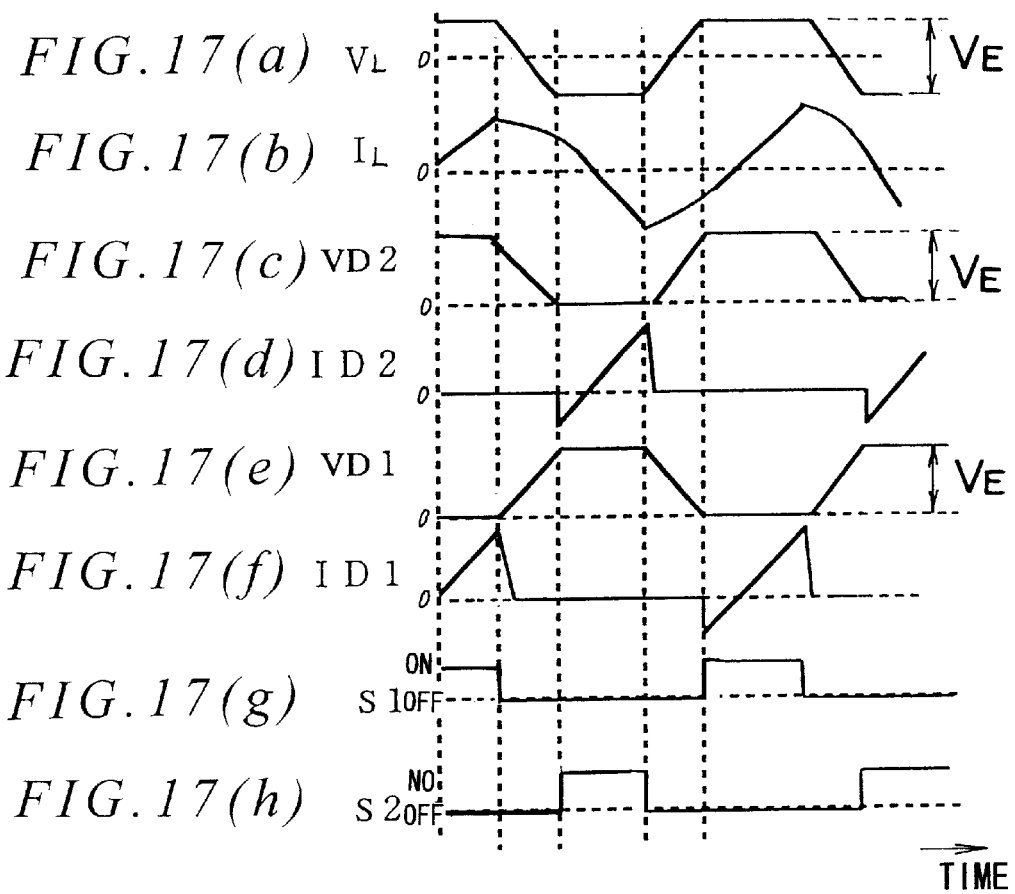
FIG. 17 is a graph illustrating the operation of the above circuit.

FIG. 16 shows a circuit of the non-contact electrical power transmission system having a capacitor C1 connected in parallel with the primary winding n1 of the transformer T. This circuit is otherwise the same as the circuit configuration shown in FIG. 15. In this example, the capacitance of the capacitor C1 is made relatively large to utilize a resonance of an inductance component L1 of the primary winding n1 and the like therewith. In fact, the entire circuit is an object of the resonance when the load 10 side is viewed from the primary winding n1. The resonance condition varies according to the primary winding n1, the secondary winding n2, the mutual inductance, the matching capacitor C2 on the secondary side, and the load 10. The capacitor C1 is not necessarily required in parallel with the primary winding n1, but may be connected to provide an equivalent circuit. For example, in the circuit shown in FIG. 16, the capacitor may be connected in parallel with the switching elements S1 and S2. FIG. 17 shows the operation waveform of each part of the circuit of FIG. 16, in which:

(a) indicates a voltage VL across the primary winding n1;
(b) indicates a current IL flowing through the primary winding n1;
(c) indicates a voltage VD2 across the switching element S2;
(d) indicates a current (drain current) ID2 flowing through the switching element S2;
(e) indicates a voltage VD1 across the switching element S1;
(f) indicates a current (drain current) ID1 flowing through the switching element S1;
(g) indicates an on/off of the switching element S1;
(h) indicates an on/off of the switching element S2.

In the non-contact electrical power transmission system shown in FIG. 16, providing a time period (referred to as the dead time) in which both the switching elements S1, S2 become off as shown in FIG. 17(g), (h) during alternately turning on/off of the switching elements S1, S2 causes the voltage VL across the primary winding n1 together with the inductance component L1 of the primary winding n1 and the like to generate a resonance voltage by the resonance circuit of the capacitor C1 during the dead time as shown in FIG. 17(a), whereby the voltage varies until it reaches the power source voltage or GND level. When the power source voltage or GND level is reached, the voltage is clamped by the circulating diodes DS1, DS2. This well-known effective method of eliminating the turn-on loss switching elements S1, S2 is known as a partial resonance technique or a soft switching technique. When loss reduction is an object, the capacitance of the capacitor C1 need not be large. Utilizing the parasitic capacity or the like of the switching elements S1, S2 consisting of MOSFETs allows loss reduction to be accomplished even when the capacitor C1 is omitted.

On the contrary, the present invention has features in that the waveform of the voltage VL across the primary winding n1 is made a trapezoidal wave shape as shown in FIG. 17(a) by utilizing the capacitor C1 having a relatively large capacitance to increase the resonance frequency by the above-mentioned inductance component L1 and the like with the capacitor C1. Selecting a specific capacitance as the capacitance of the capacitor C1 in order to obtain a resonance voltage forming the rising and falling (both in the dead time period) of the trapezoidal wave causes both the rising and falling time to become relatively long at no-load, and both the rising and falling time to become relatively short at full-load (provided that the on-time period of the switching elements S1, S2 is constant in the load range). Thus, the drive frequency becomes low at no-load, and becomes high at full-load, so that the system stabilizes the load voltage V0. Also, the waveform of the voltage VL across the primary winding n1 is changed from the trapezoidal wave to the square wave, whereby the equivalent voltage amplitude of the voltage applied to the primary winding n1 at no-load is lower than for the square wave, thereby restraining the rise of the load voltage V0.

The resonance determining the rising time and falling time of the voltage VL across the primary winding n1 is established not only the capacitor C1 and the inductance component L1 as mentioned above, but also by the capacitor C1, the primary winding n1 when the load side is viewed from the inductance component L1 side, the secondary winding n2, the mutual inductance, and the circuit including the matching capacitor C2 on the secondary side and the load 10. Further, the resonance is also affected by rectifying-smoothing system. Therefore, it will be assumed that a changed condition of the load 10 (for example, where the load 10 is a resistance, change of resistance value) acts mutually with the circuit system, whereby the change is reflected as a change of the resonance frequency, with the result that the rising and falling time and the waveform are automatically changed.

Third Embodiment

Figure 18:
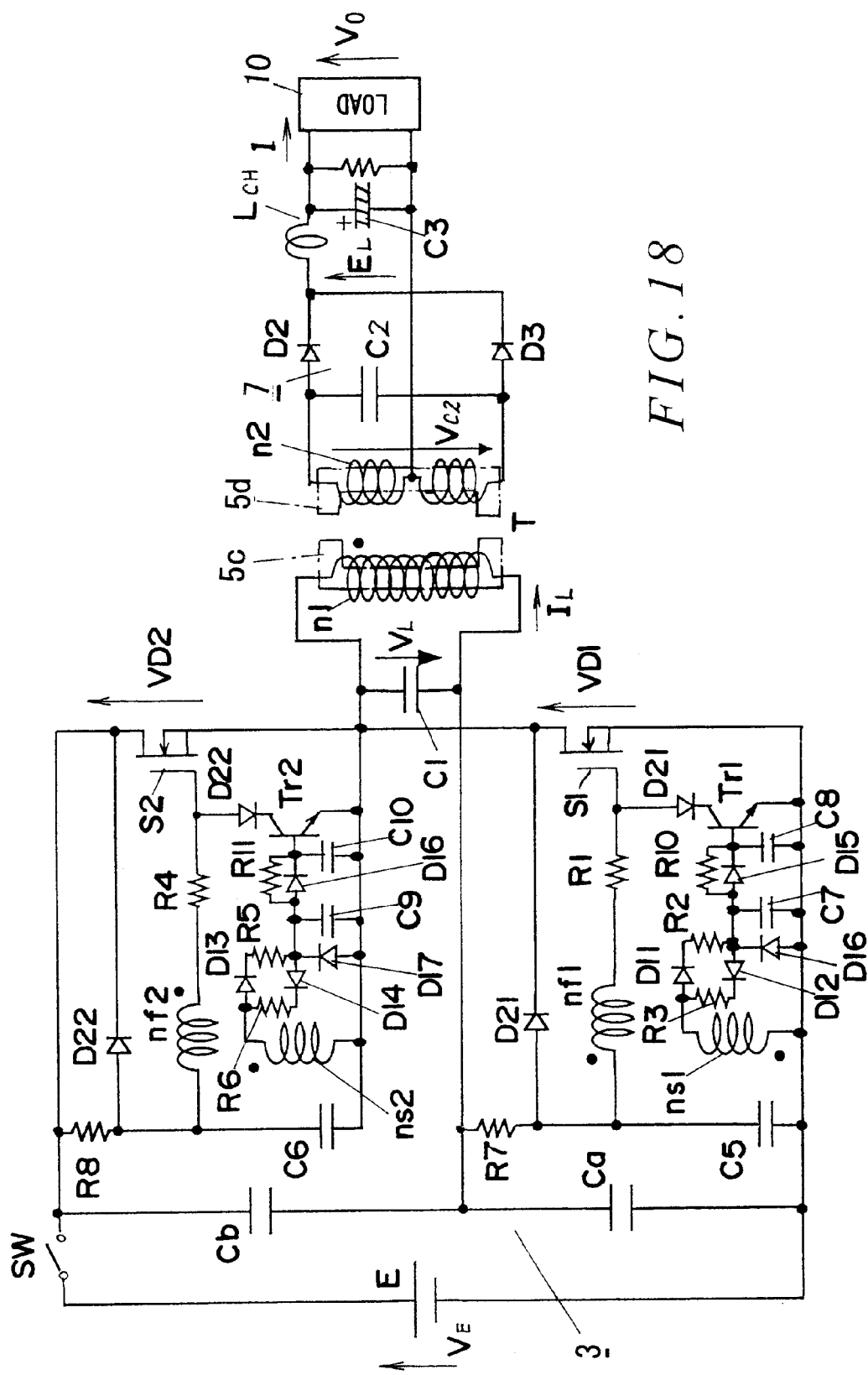
FIG. 18 is a circuit diagram of the system in accordance with a third embodiment of the present invention.

FIG. 18 shows a circuit of the non-contact electrical power transmission system in accordance with this embodiment. While the drive circuit 3 in the circuit described in the second embodiment shown in FIG. 17 is a separately-excited half-bridge type inverter, the drive circuit 3 in the non-contact electrical power transmission system of this embodiment consists of a self-excited partial oscillation converter. This embodiment does not require the provision of a separate control circuit including an oscillation circuit for turning on/off voltage-drive type switching elements S1 and S2 such as MOSFETs. The configuration of the transformer T, and the configuration of the rectifier circuit 7 for rectifying the output of the secondary winding n2 thereof are similar to those of the second embodiment.

In the drive circuit 3, the serial circuit of a pair of capacitors Ca, Cb, and the serial circuit of the switching elements S1, S2 consisting of a pair of power MOSFETs are connected parallel to each other to the serial circuit of the DC power source E and a switch SW. The primary winding n1 of the transformer T is connected between the junction of the capacitors Ca, Cb and the junction of the switching elements S1, S2. The capacitor C1 is connected in parallel with the primary winding n1. A circulating diode (not shown), consisting of the body diodes of MOSFETs, is connected reversely parallel to each switching elements S1, S2. The DC power source E is obtained, for example, by rectifying/smoothing a commercial power source.

Drive circuit 3 includes two feedback windings nf1, nf2 and two auxiliary windings ns1, ns2 magnetically coupled to the primary winding n1 of the transformer T, respectively. The series circuits of resistances R7, R8 and capacitors C5, C6 are connected across respective switching elements S1, S2. The series circuit of the feedback windings nf1, nf2 and resistances R1, R4 are connected between the junction of the resistances R7, R8 with the capacitors C5, C6, and the control terminals of the switching elements S1, S2. An input voltage is applied to the control terminals of the switching elements S1, S2 through the feedback windings nf1, nf2. A charging/discharging circuit is connected across the auxiliary windings ns1, ns2 for controlling the input voltage to the switching elements S1, S2. The charging portion of the charging/discharging circuit connected across the auxiliary windings ns1 consists of resistances R2, R3, R10, diodes D11, D12, D16, D21, capacitors C7, C8, and a transistor Tr1. The discharge portion of the charge/discharge circuit includes the diode D21 and the transistor Tr1. The charging portion of the charging/discharging circuit connected across the auxiliary windings ns2 consists of resistances R5, R6, R11, diodes D13, D14, D17, D22, capacitors C9, C10, and a transistor Tr2. The discharge portion of the charging/discharging circuit includes the diode D22 and the transistor Tr2.

There will be explained hereinafter the operation of the non-contact electrical power transmission system of this embodiment. Closing the switch SW causes the capacitors C5, C6 to be charged through the resistances R7, R8. The voltage of the capacitors C5, C6 is applied to the gate of the switching elements S1, S2. When the voltage of either of the capacitors C5, C6 reaches the threshold value of the switching elements S1, S2, for example, when the voltage of the capacitor C5 reaches a threshold value of the switching element S1, the switching elements S1 is turned on to cause the current IL to begin to flow through the primary winding n1. An induced voltage develops in the feedback winding nf1 in the direction in which the switching element S1 continues to be on, whereby the switching element S1 maintains a stable on-condition. This induced voltage is superimposed on the electric potential of the capacitor C6. At this time, although the voltage of the capacitor C5 is discharged to the ground level by the diode D21 connected between the resistance R7 and the switching element S1, the on-condition of the switching element S1 is sufficiently maintained by the induced voltage of the feedback winding nf1. Meanwhile, together with the development of the induced voltage of the feedback winding nf1, an induced voltage develops also in the auxiliary windings ns1. The auxiliary windings ns1 is connected with the above-mentioned charging/discharging circuit, so that when the induced voltage develops in the auxiliary windings ns1, the capacitor C7 is charged through the diode D11 and the resistance R2. At the same time, the capacitor C8 connected between the base and emitter of the transistor Tr1 is charged through the diode D15. As the charging of the capacitors C7, C8 proceeds, in a short time the transistor Tr1 is turned on, the gate voltage of the switching elements S1 lowers, so that the switching elements S1 is turned off. When the switching elements S1 is turned off, the current IL having flowed through the primary winding n1 is communicated to the capacitor C1 so as to maintain the current, and in such a condition, there begins a free oscillation (for convenience, referred to as the resonance) of the capacitor C1 with a circuit when the load side is viewed from the inductance component L1 side of the primary winding n1. In a short time after resonance begins, the voltage VD1 across the switching elements S1 becomes the power source voltage VE, the voltage VD1 is clamped through a circulating diode (not shown) consisting of the body diode of the switching elements S2 to the power source voltage VE.

On the one hand, the polarity reversal of the voltage VL and the current direction change of the current IL causes a reverse voltage to be induced in the feedback winding nf1 and the auxiliary winding ns1, thereby maintaining the off-condition of the switching elements S1. At the same time, the reversely-induced voltage of the auxiliary winding ns1 pulls through the diode D12 and the resistance R3 out the electric charge of the capacitor C7 to make the remaining charge on the capacitor C7 approximately zero. At this time, the electric charge of the capacitor C8 is also gradually discharged through the resistance R10. Simultaneously with the operation, a positive induced voltage develops in the feedback winding nf2 and the auxiliary winding ns2. As the induced voltage develops in the feedback winding nf2, a delay time develops by the resistance R4 and the input capacity of the switching elements S2, so that turn-on of the switching elements S2 is delayed, thereby maintaining the on-condition. With the voltage change period due to this resonance and with the above-mentioned delay, a dead-time period exists during which both the switching element S1 and the switching element S2 are turned off. The voltage induced in the feedback winding nf2 proceeds to charge through the diode D13 and the resistance R5 the capacitors C9, C10. Then, as the charging voltage of the capacitor C10 increases with time, the transistor Tr2 is turned on and the switching elements S2 is turned off. Thereafter, a similar operation is repeated to continue the self-oscillation. Even when the dead time changes, this circuit make the time duration of the on-time of the switching elements S1, S2 substantially constant.

In the non-contact electrical power transmission system of this embodiment, the capacitance of the matching capacitor C2 is set to satisfy the above-mentioned formula (1). That is, the capacitance of the matching capacitor C2 is set to satisfy the condition of the following formula:

$$4 \cdot \pi \cdot f \cdot (L02 \cdot C2)^{1/2} = 1$$

Figure 19:
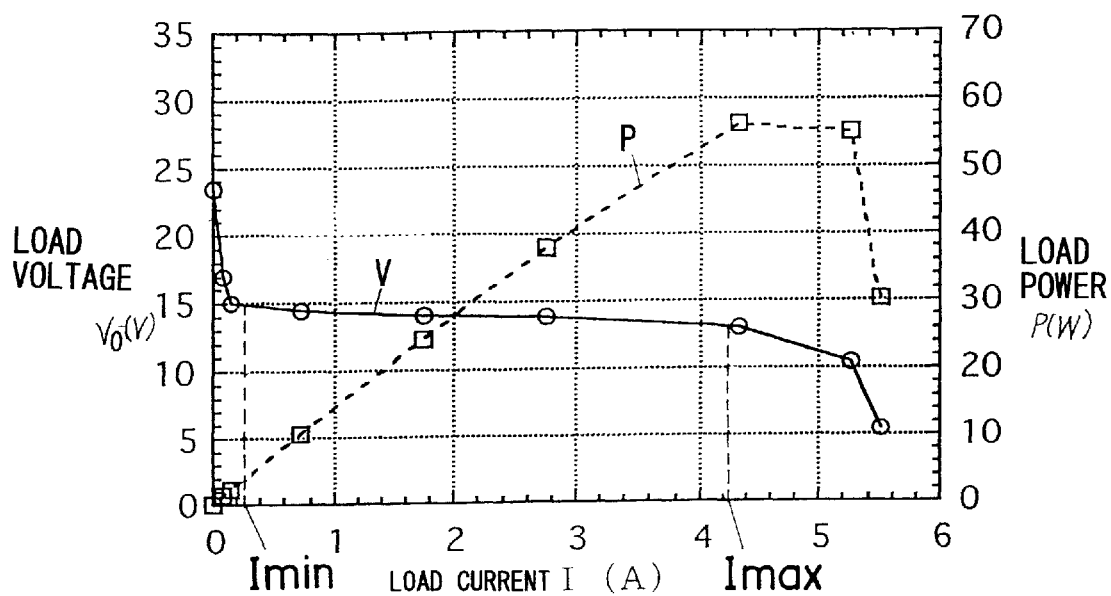
FIG. 19 is a characteristic output graph of the circuit of FIG. 18.

In the circuit of FIG. 18, taking the capacitance C2 of the matching capacitor C2 as 0.062 $\mu$F, and the capacitance of the capacitor C1 as 0.022 $\mu$F, the result shown in FIG. 19 is obtained by changing the resistance value of the load 10, and measuring the load voltage/load current characteristics and the load power/load current characteristics. It will be understood in FIG. 19 that the voltage change rate in a load current range from the minimum load current value Imin to the maximum load current value Imax of the load current I is on the order of 0.4 V/A, which is a substantial improvement over the voltage change rate (0.6 V/A) in the output characteristics of FIG. 3 described in the first embodiment. An example of the waveform at the time of a load current close to no-load involved in this improvement, and an example of the waveform at the time of a load current close to full-load are shown in FIG. 20 and FIG. 21, respectively. In FIG. 20 and FIG. 21, (a) indicates the voltage VL across the primary winding n1; (b), the voltage VC2 across the matching capacitor C2; (c), the load current I flowing through the load 10; and (d), the load voltage V0.

When the load current I is close to no-load shown in FIG. 20, the voltage waveform of the primary winding n1 is a trapezoidal waveform with a frequency of approximately 70 kHz. At full-load shown in FIG. 21, the voltage waveform of the primary winding n1 is a trapezoidal waveform with a frequency approximately 80 kHz. In a word, the frequency varies automatically with changes in load over a range on the order of 10 kHz. In addition, the waveform shape can automatically change such as in its inclination at the rising time and the falling time. The on-time of each switching elements S1, S2 at this time is substantially constant at approximately 4 $\mu$ seconds.

In this embodiment, the dead time is provided as mentioned above. The combination of circuit constants which provide the desired properties are derived by one skilled in the art by simple trial and error. In particular, one skilled in the art will seek for a particular application a combination of circuit constants which change automatically the rising time and falling time of the resonance voltage (either of the time being a time period from the resonance starting time to the time when the resonance voltage is clamped to the source voltage or ground potential) utilizing resonance during the dead time, or the voltage waveform according to the load. More specifically, measuring the waveform at a load close to no-load and at full-load can discover a combination of constants appropriately varying with respect to period or waveform.

The output characteristics of FIG. 19, the load voltage V0 is large in a current region in which the load current I is smaller than the minimum load current value Imin. Since such a state is often found in practice, it is sufficient to connect a circuit element, such as a resistive dummy load across the output terminals (load connecting terminals). This guarantees that a load current of at least the minimum load current value Imin can flow, even in the absence of an actual load, or with a very small load.

FOURTH EMBODIMENT

Figure 22:
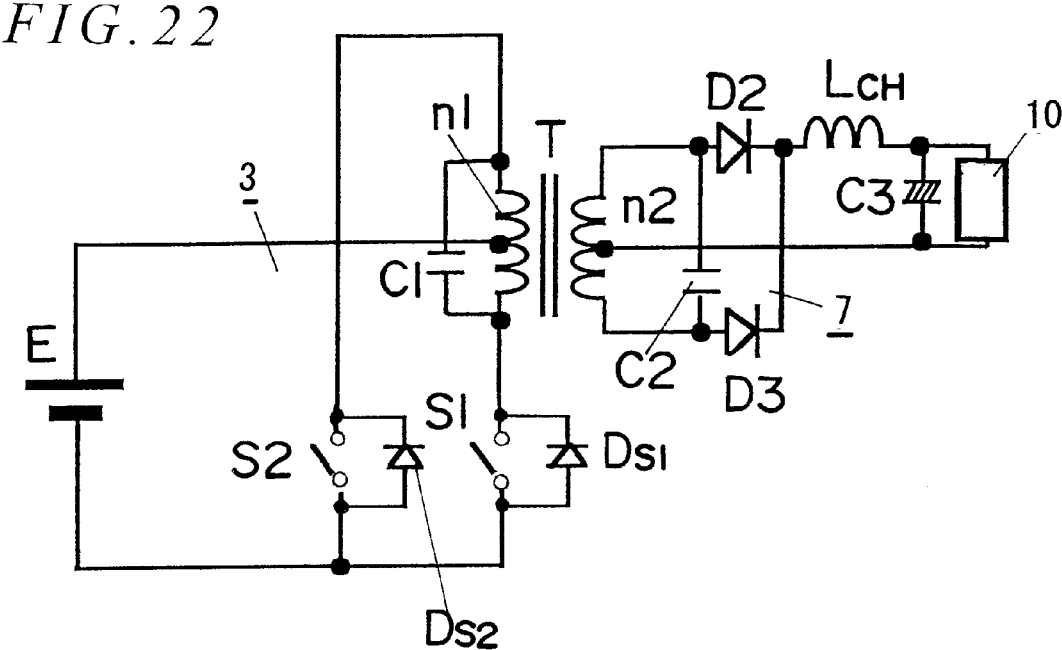
FIG. 22 is a circuit diagram of the system in accordance with a fourth embodiment of the present invention.

The basic configuration of the non-contact electrical power transmission system according to this embodiment is substantially the same as that of the first and second embodiments. The system has features in that as shown in FIG. 22, it uses a push-pull type inverter as a drive circuit 3 for supplying the high-frequency AC voltage to the primary winding n1 of the separable transformer T.

FIFTH EMBODIMENT

Figure 23:
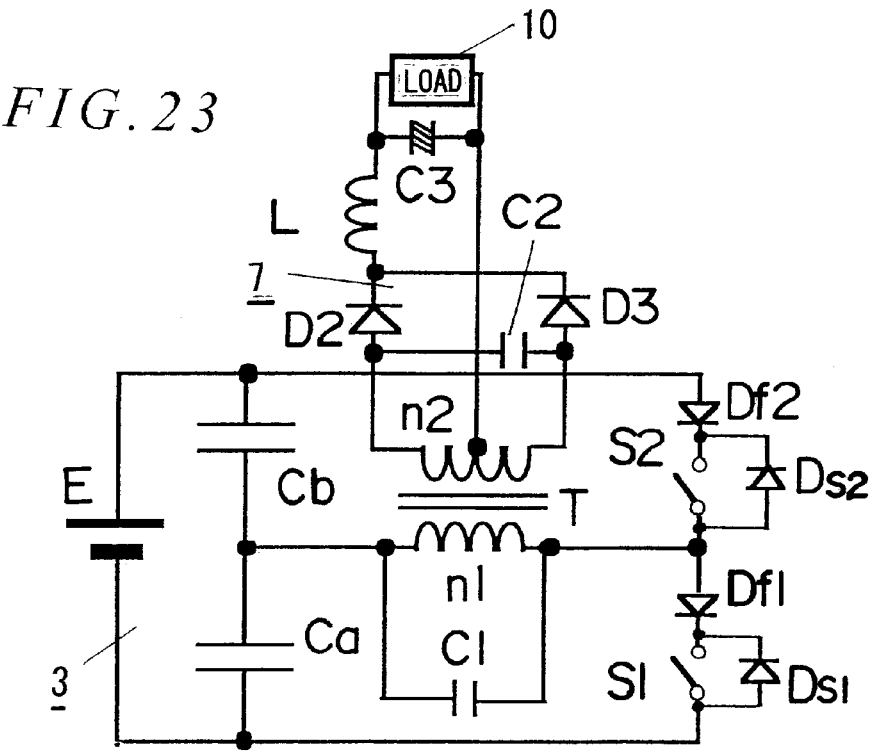
FIG. 23 is a circuit diagram of the system in accordance with a fifth embodiment of the present invention.

The basic configuration of the non-contact electrical power transmission system according to this embodiment is substantially the same as that of the first and second embodiments, and the system has features in that as shown in FIG. 23, there are provided diodes Df1, Df2 connected in series to the switching elements S1, S2 and reversely to circulating diodes DS1, DS2 so that the voltage of the primary winding n1 is not clamped at ground level, thereby operating the resonance voltage as the waveform of sinusoidal wave.

Further, although the present invention relates to a non-contact electrical power transmission system using a separable transformer having inevitably a low-degree of magnetic coupling and a large leakage inductance for power transmission, the present invention can also be applied to a case where a fixed transformer used with a reduced degree of magnetic coupling is used for power transmission. The load voltage is stabilized in a wide load current change range without requiring a feedback control circuit. Even a feedback control circuit is used, the number of additional parts and consequent additional cost are reduced.

SIXTH EMBODIMENT

Figure 24:
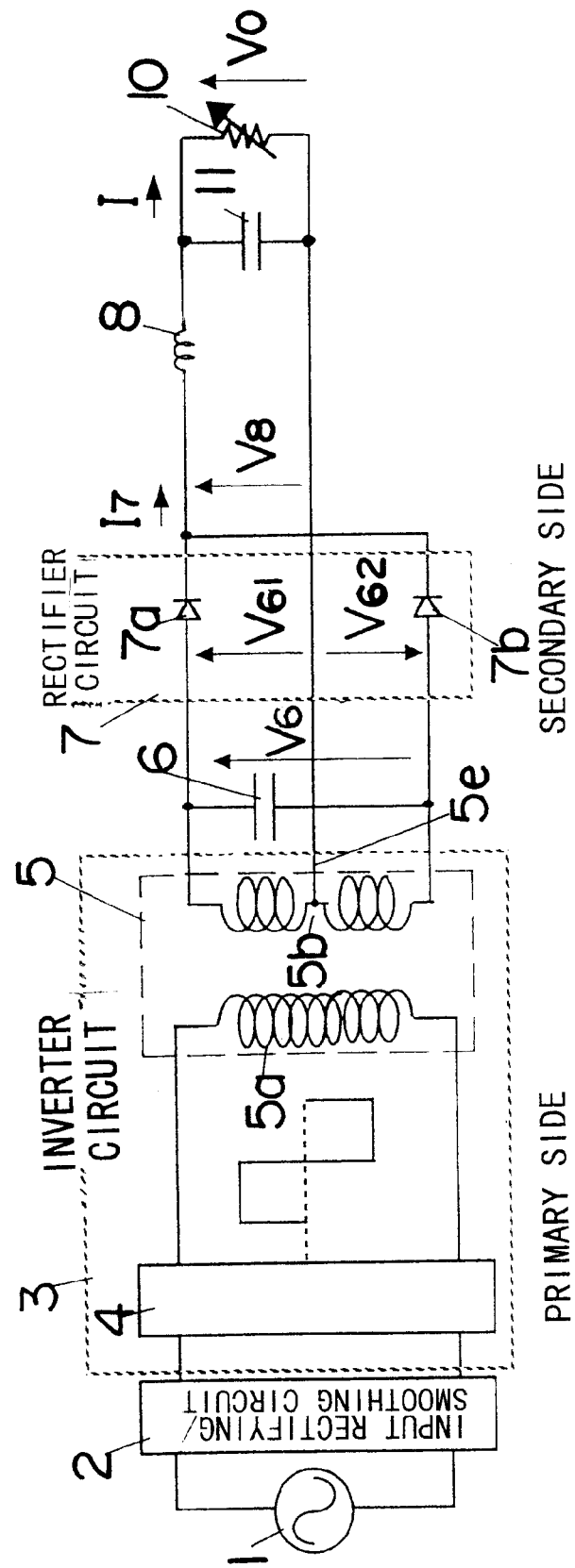
FIG. 24 is a circuit configuration diagram of the system in accordance with a sixth embodiment of the present invention.

There will be explained hereinafter still another embodiment of the present invention. FIG. 24 shows a configuration of a non-contact electrical power transmission system. The system comprises a AC power source 1, an input rectifying/smoothing circuit 2 for rectifying/smoothing the AC power source 1, an inverter circuit 3, a first capacitor 6 connected parallel to a secondary winding 5b for matching the load on the secondary winding 5b side, a rectifier circuit 7 for full-wave rectifying an induced voltage of the secondary winding 5b, a current matching reactor 8 for smoothing an output current 17 of the rectifier circuit 7, a variable resistance 10 being a load, and a capacitor 11 connected parallel to the variable resistance 10. The inverter circuit 3 consists of a power converting section 4 for converting the output of the input rectifying/smoothing circuit 2 to a high-frequency power, and a transformer 5 into which the high-frequency power is inputted from the power converting section 4. The transformer 5 consists of a primary winding 5a, and a secondary winding 5b having a center tap 5e. The variable resistance 10 is connected to the output terminal of the current matching reactor 8 and to the center tap 5e of the secondary winding 5b. The primary winding 5a and the secondary winding 5b represent the separable/detachable transformer 5. The rectifier circuit 7 consists of diodes 7a, 7b. One end of each of the diodes 7a, 7b is connected serially and mutually in an opposite direction to the output ends of the secondary winding 5b. The second ends of the diodes 7a, 7b are connected together. The capacitor 11 not only includes a capacitor for smoothing the output terminal voltage supplied to the variable resistance 10 and a noise controlling capacitor, but also includes a capacitance due to elements or substrates and a capacitance of an input part inside the variable resistance 10.

Figure 25:
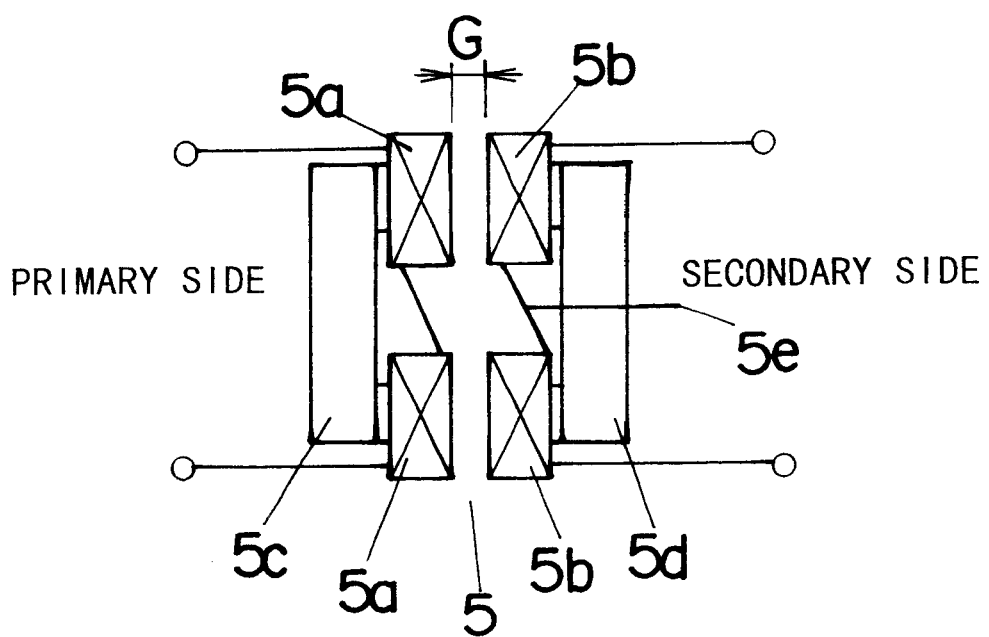
FIG. 25 is a configuration diagram of a separable/detachable transformer in the above system.
Figure 36:
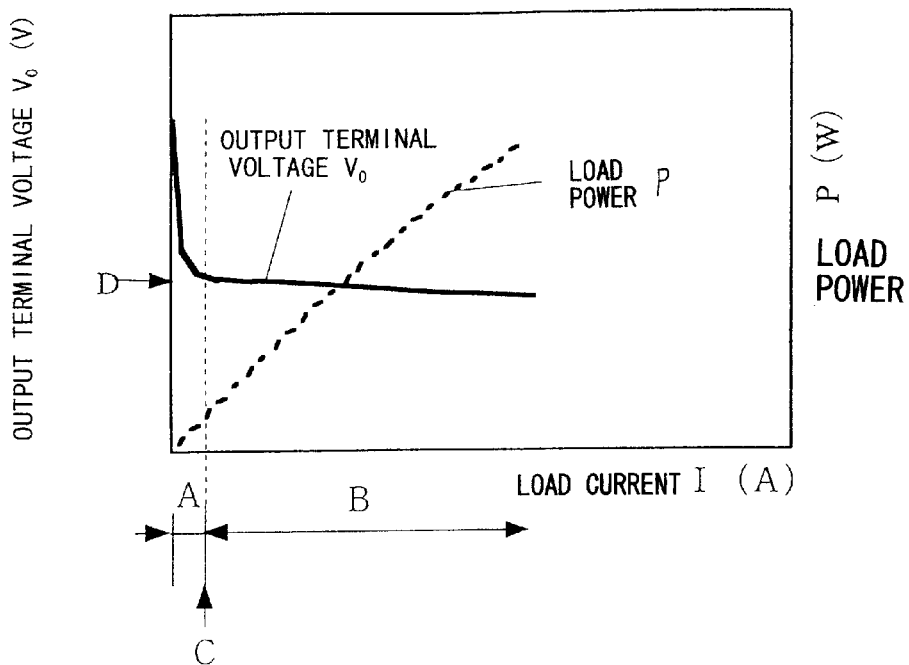
FIG. 36 is a characteristic graph to help explain the operation of a prior art example.

FIG. 25 shows a configuration of the separable/detachable transformer 5, in which the primary side is formed by wrapping the primary winding 5a on a core 5c consisting of a magnetic substance, while the secondary side is formed by wrapping the secondary winding 5b on a core 5d. A center tap 5e is formed on the secondary winding 5b. The primary side and the secondary side are positioned opposite each other across a gap G. The characteristics of the output terminal voltage V0 and the load power P with respect to the load current I supplied to the variable resistance 10 when using such a separable/detachable transformer 5 is shown as in FIG. 36 similarly to the above-mentioned prior art example, in which the load power P is substantially proportional to the load current I, and the output terminal voltage V0 is stable in a light load/full load region B, while in a no-load/minute load region A, the output terminal voltage V0 increases rapidly. To restrain the output terminal voltage V0 to the voltage at a point D of FIG. 26 in the no-load/minute load region A, it is necessary to connect a dummy load such as a resistance capable of flowing the load current I at a point C at all times parallel to the variable resistance 10. However, when power loss in the dummy load is several watts or more, a dummy load with a large capacity is required, leading to a large circuit size and a increased cost.

Figure 26:
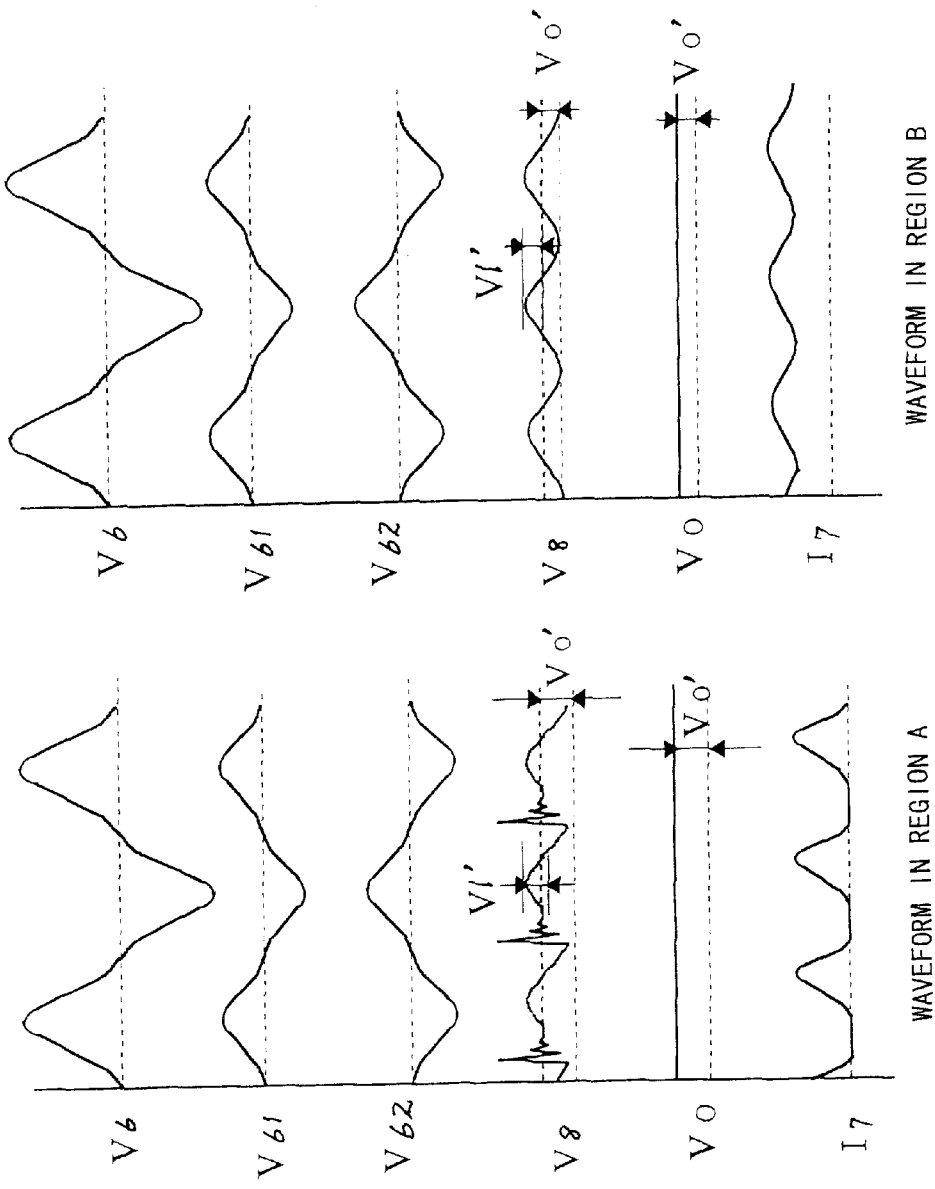
FIG. 26 is a waveform chart to help explain the operation of the above system.

When a load current I equivalent to the no-load/minute load region A in FIG. 26 is made to flow, and when a load current I equivalent to the light load/full load region B is made to flow, an induced voltage V6 of the secondary winding 5b, a voltage (pre-rectification voltage) V61 between one end of the secondary winding 5b and the center tap 5e, a voltage (pre-rectification voltage) V62 between the other end of the secondary winding 5b and the center tap 5e, a voltage (input part voltage of reactor) V8 between the input terminal of the current smoothing reactor 8 and the center tap 5e, an output terminal voltage V0, and an output current (rectifier circuit output current) I7 of the rectifier circuit 7 are shown in FIG. 26(a) and FIG. 26(b), respectively, with respect to their waveform. As shown in FIGS. 26(a), (b), the induced voltage V6 of the secondary winding 5b and the pre-rectification voltages V61, V62 are of a similar AC waveform with sinusoidal wave shape in both the no-load/minute load region A and the light load/full load region B. However, the rectifier circuit output current I7 exhibits a discontinuous condition in which a current flowing time and a no-current flowing time are alternately repeated in rectifier circuit in the no-load/minute load region A, while it exhibits a continuous condition in which a current flows at all time in the light load/full load region B. The reactor input part voltage V8 exhibits a waveform on which a sinusoidal wave-shaped AC voltage is superimposed in the light load/full load region B, while in the no-load/minute load region A, a ringing is superimposed to cause the waveform to fluctuate during zero period in which no rectifier circuit output current I7 flows. The output terminal voltage V0 at this time becomes larger in the no-load/minute load region A than in the light load/full load region B, so that it can be predicted that the rapid increase of the output terminal voltage V0 in the no-load/minute load region A is caused by the rectifier circuit output current I7 and the reactor input part voltage V8.

In the light load/full load region B, the rectifier circuit output current I7 exhibits a continuous condition with respect to all load currents I in which the rectified waveform of the pre-rectification voltage V61 (or V62) appears as the reactor input part voltage V8 as it is. The reactor input part voltage V8 exhibits a waveform in which a sinusoidal-wave shaped AC voltage is superimposed as an AC voltage component on an amplitude V0' of the output terminal voltage V0, an amplitude V1' of the sinusoidal-wave shaped AC voltage being equal to the amplitude V0' of the output terminal voltage V0. Therefore, it will be assumed that if each waveform satisfies these features, a rise of the output terminal voltage V0 is prevented at the load current I at that time.

However, in the no-load/minute-load region A, the waveform of the reactor input part voltage V8 does not exhibit the rectified waveform of the pre-rectification voltage V61 (or V62). As a result, ringing is superimposed to cause the waveform to fluctuate during the zero period when no rectifier circuit output current I7 flows. The longer the zero period when no rectifier circuit output voltage I7 flows, the larger the resistance value of the variable resistance 10 becomes (the lighter the variable resistance 10 as a load becomes). Then, the longer the zero period when no rectifier circuit output voltage I7 flows, the largely the waveform of the reactor input part voltage V8 varies compared to the waveform in the light-load/full-load region B. Thus it will be assumed that the output terminal voltage V0 also increases in association with that fact. The increase in the discontinuity of the rectifier circuit output current I7 (the increase in the zero period when no rectifier circuit output voltage I7 flows) corresponds to a fact that the amplitude V1' of the sinusoidal wave-shaped AC voltage superimposed on the amplitude V0' of the output terminal voltage V0 decreases compared to the amplitude V0'. In a completely no-load condition, the output terminal voltage V0 increases to near the peak voltage of the pre-rectification voltage V61 (or V62), and the amplitude V1' approaches zero. To control the rise of the output terminal voltage V0 in the no-load/minute-load region A and reduce the circuit size, it will be assumed to be necessary that the load current I when the rectifier circuit output current I7 begins to vary from the discontinuous condition to the discontinuous condition is made as small as possible, and a dummy load is used in combination. The dummy load may be substituted by the self-loss of already-used circuit parts in some cases.

SEVENTH EMBODIMENT

Figure 27:
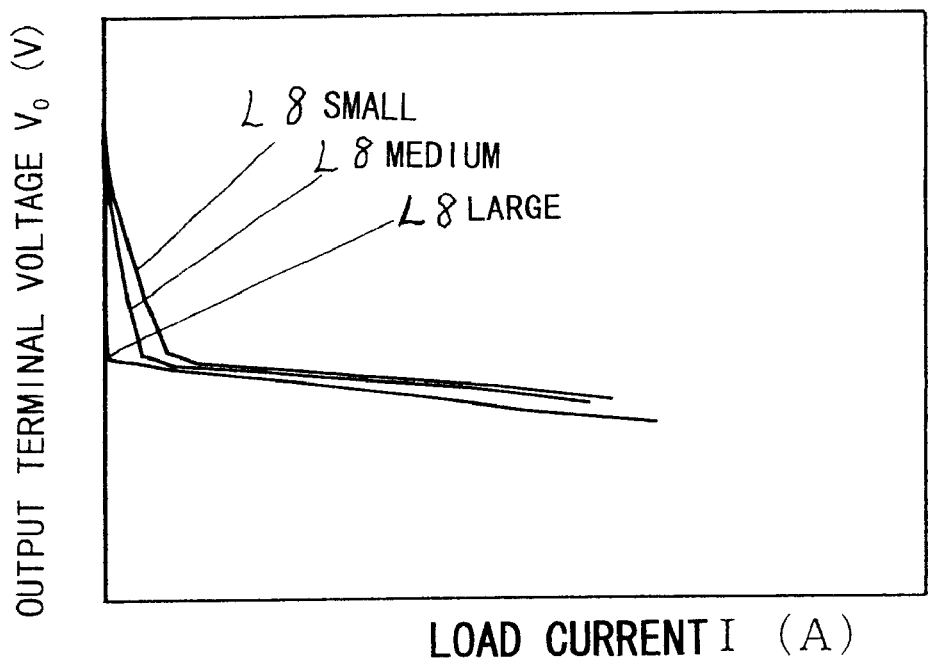
FIG. 27 is a characteristic graph to help explain the operation of the above system.

It has been discovered that first of all, it suffices to make the inductance value of the current smoothing reactor 8 larger as one of methods. FIG. 27 shows characteristics of the load current I and the output terminal voltage V0 when the inductance value L8 of the current smoothing reactor 8 is changed between large, medium, and small values. Increasing the inductance value L8 of the current smoothing reactor 8 reduces changes in the load current I when the rectifier circuit output current I7 begins to vary from the discontinuous condition to the continuous condition, thereby widening the range in which the rise of the output terminal voltage V0 is restrained. This also reduces losses in the dummy load connected parallel to the output terminal in order to provide a commercial application.

EIGHTH EMBODIMENT

Figure 28:
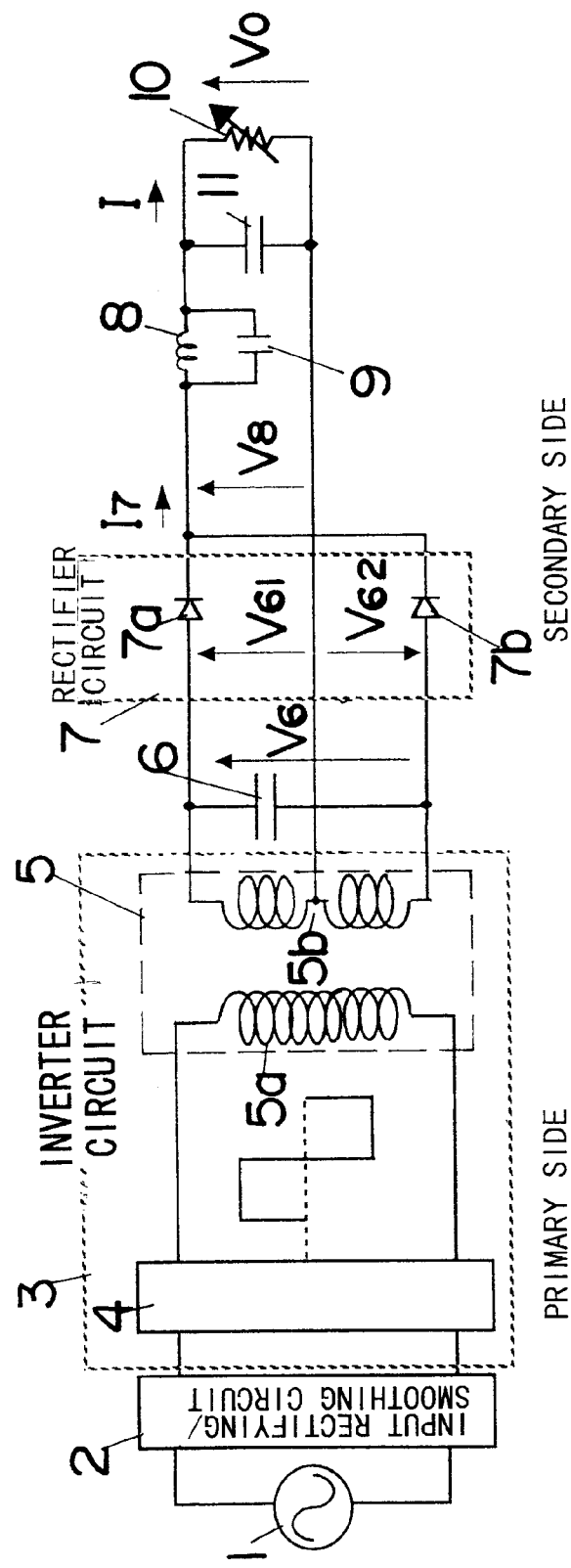
FIG. 28 is a circuit diagram of the system in accordance with a seventh embodiment of the present invention.

There will be explained hereinafter a second method of reducing the load current I when the rectifier circuit output current I7 varies from the discontinuous condition to the continuous condition. FIG. 28 shows the circuit in which a second capacitor 9 is connected parallel to the current smoothing reactor 8 of the circuit shown in FIG. 24. Appropriately selecting the capacitance of the second capacitor 9 can widen the range in which the rise of the output terminal voltage V0 is restrained even in the no-load/minute-load region A compared to FIG. 36, as shown in FIG. 29.

Figure 29:
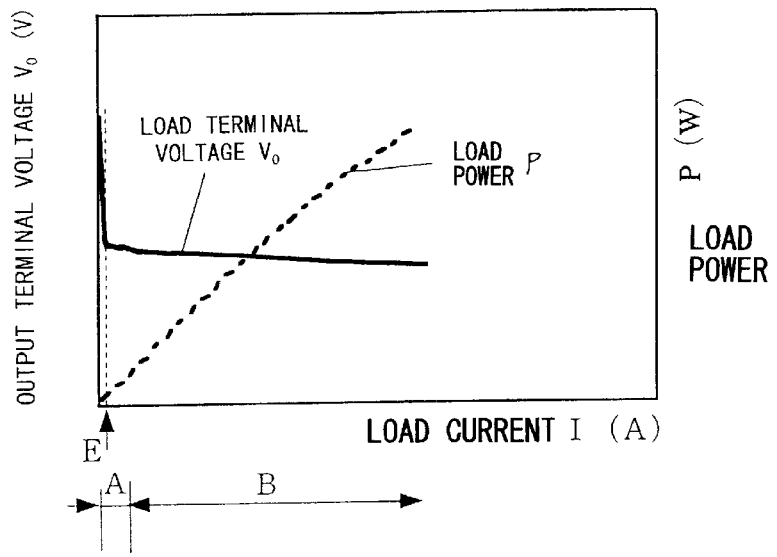
FIG. 29 is a characteristic graph to help explain the operation of the above system.
Figure 30:
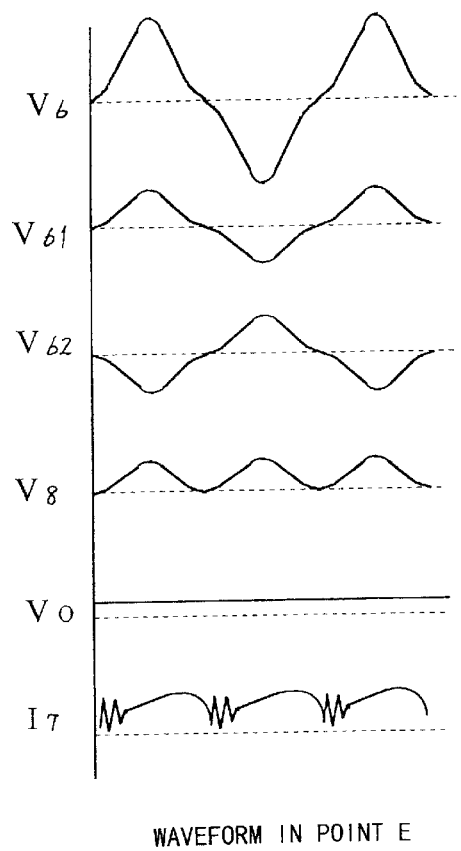
FIG. 30 is a waveform chart to help explain the operation of the above system.

At the point E in the no-load/minute-load region A of FIG. 29, the induced voltage V6 of the secondary winding 5b, the voltage (pre-rectification voltage) V61 between one end of the secondary winding 5b and the center tap 5e, the voltage (pre-rectification voltage) V62 between the other end of the secondary winding 5b and the center tap 5e, the voltage (reactor input part voltage) V8 between the input terminal of the current smoothing reactor 8 and the center tap 5e, and the rectifier circuit output current I7 (the current flowing into the current smoothing reactor 8 and the second capacitor 9) are shown in FIG. 30 with respect to their waveform. Now, the induced voltage V6 of the secondary winding 5b, the pre-rectification voltage V61, and the pre-rectification voltage V62 exhibit a sinusoidal AC voltage waveform. Selecting appropriately the electrostatic capacitance of the second capacitor 9 causes the zero period of the rectifier circuit output current I7 to be shortened, the reactor input part voltage V8 to approach the reactor input part voltage V8 shown in FIG. 26(b), the rectifier circuit output current I7 to exhibit a continuous condition in some cases, and the reactor input part voltage V8 to exhibit a waveform on which a sinusoidal AC voltage waveform is superimposed, thereby allowing a rise of the output terminal voltage V0 to be restrained.

The setting of the electrostatic capacitance of the second capacitor 9 to make the rectifier circuit output current I7 close to the continuous condition at the smallest load current I as shown in FIG. 30 and to make the reactor input part voltage V8 close to the rectified waveform of the pre-rectification voltage V61 (or V62) is reliably performed while confirming experimentally each waveform by trail and error. However, a condition formula to set numeral values as a guide has been discovered. This is performed by setting each value so that the inductance value L8 of the current smoothing reactor 8, the electrostatic capacitance C9 of the second capacitor 9, and the frequency f of the voltage applied to the primary winding 5e satisfy the following relationship:

$$f=1/\{4\times\pi\times\sqrt{(L8\times C9)}\} \quad (4)$$

The concept of the formula (4) will be explained hereinafter. To prevent the rise of the output terminal voltage V0, it is required that the rectifier circuit output current I7 exhibits the continuous condition, and that the reactor input part voltage V8 exhibits the rectified waveform of the pre-rectification voltage V61 (or V62). Thus, it has been devised that when the reactor input part voltage V8 exhibits the waveform of the reactor input part voltage V8 of FIG. 26(a) in the no-load/minute-load region A, if that waveform can be formerly shaped into the waveform of the reactor input part voltage V8 shown in FIG. 26(b), as a result, the rise of the output terminal voltage V0 will be restrained. The reactor input part voltage V8 shown in FIG. 26(b) exhibits a waveform in which a sinusoidal wave-shaped AC voltage being an AC voltage component is superimposed on the amplitude V0' of the output terminal voltage V0, the amplitude V1' of the sinusoidal wave-shaped AC voltage becoming equal to the amplitude V0' of the output terminal voltage V0. The induced voltage V6 of the secondary winding 5b is also a sinusoidal wave-shaped AC voltage, with the same frequency as the frequency f of the voltage applied to the primary winding 5a, while the sinusoidal wave-shaped AC voltage of the reactor input part voltage V8 has a frequency of twice the frequency f. Thus, it has been devised that in order to forcibly change the reactor input part voltage V8 into a sinusoidal wave-shaped AC voltage having a frequency of twice the frequency f of the voltage applied to the primary winding 5a, setting the inductance value L8 of the current smoothing reactor 8, and the electrostatic capacitance C9 of the second capacitor 9 so as to provide a resonance with a frequency of two times the frequency f of the voltage applied to the primary winding 5a as shown in the formula (4) allows the waveform shaping to be embodied due to filter effect. As a result of verification, given an optimum improving condition for the waveform of the reactor input part voltage V8, the formula (4) can be used to predict the electrostatic capacitance C9 of the second capacitor 9 capable of shortening the zero period of the rectifier circuit output current I7 to the largest extent, and restraining the rise of the output terminal voltage V0 down to a load current I smaller than that before improvement in the no-load/minute-load region A.

Figure 31:
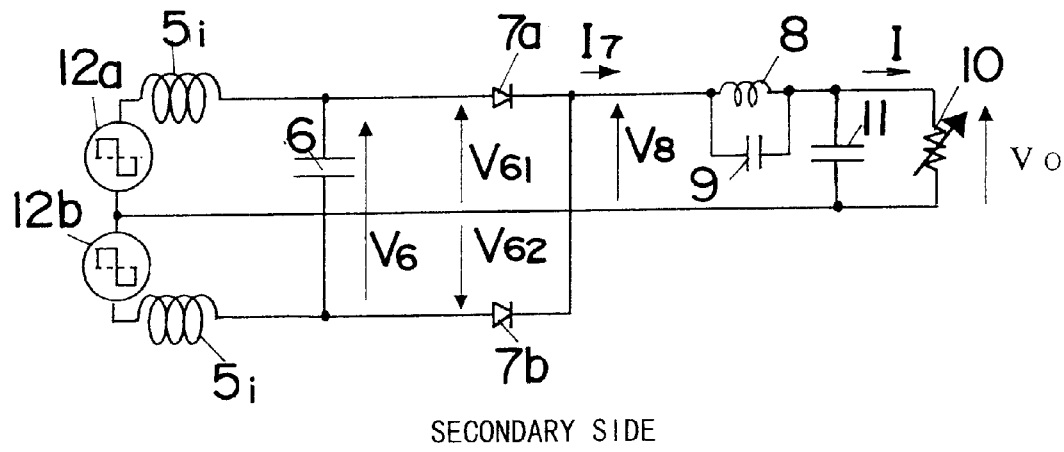
FIG. 31 is a circuit diagram of the system in accordance with an eighth embodiment of the present invention.

FIG. 31 is an equivalent circuit obtained by converting the circuit shown in FIG. 28 to the secondary side of the transformer 5. The inductance value measured from the two terminals except for the center tap of the secondary winding 5b with the two terminals of the primary winding 5a of the transformer 5 shorted out is the leakage inductance value L5 (not shown) converted to the secondary side of the transformer 5. The leakage inductance value L5 is equivalent to a sum of inductance values L5i of two leakage inductances 5i shown in FIG. 31. Thus, the secondary winding 5b is equivalent to the serial circuit of voltage sources 12a, 12b and the two leakage inductances 5i; the voltage sources 12a, 12b generate the pre-rectification voltages V61, V62; and the outlet of the center tap of the secondary winding 5b becomes the connecting middle point of the voltage sources 12a, 12b. Here, each values are set so that the leakage inductance value L5 converted to the secondary side, the electrostatic capacitance C6 of the first capacitor 6 connected parallel to the secondary winding 5b, and the frequency f of the voltage applied to the primary winding 5a satisfy the following relationship, and the configuration is made to include the capacitor 9.

$$f=1/\{4\times\pi\times\sqrt{(L5\times C6)}\} \quad (5)$$

Figure 35:
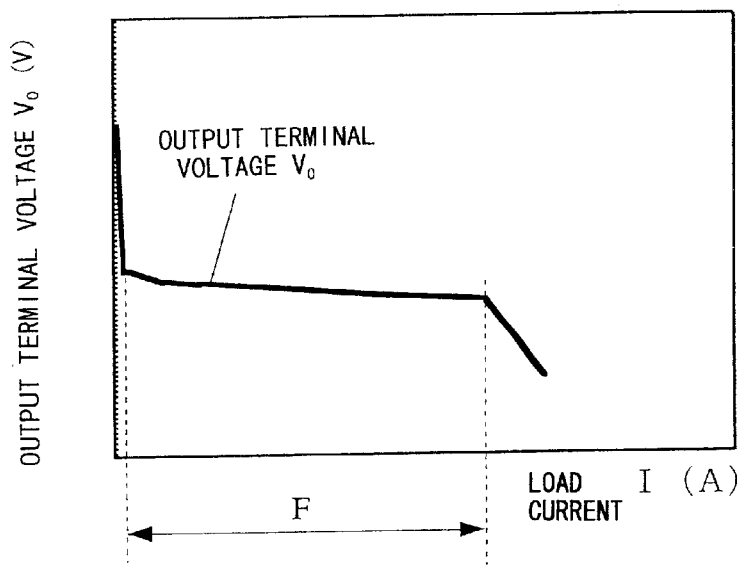
FIG. 35 is a characteristic graph to help explain the operation of the above-mentioned eighth embodiment.

This stabilizes the output terminal voltage V0 over a wide region F from near the no-load region to full-load even without performing feedback control as shown in the characteristics of the output terminal voltage V0 with respect to the load current I of FIG. 35.

NINTH EMBODIMENT

Figure 32:
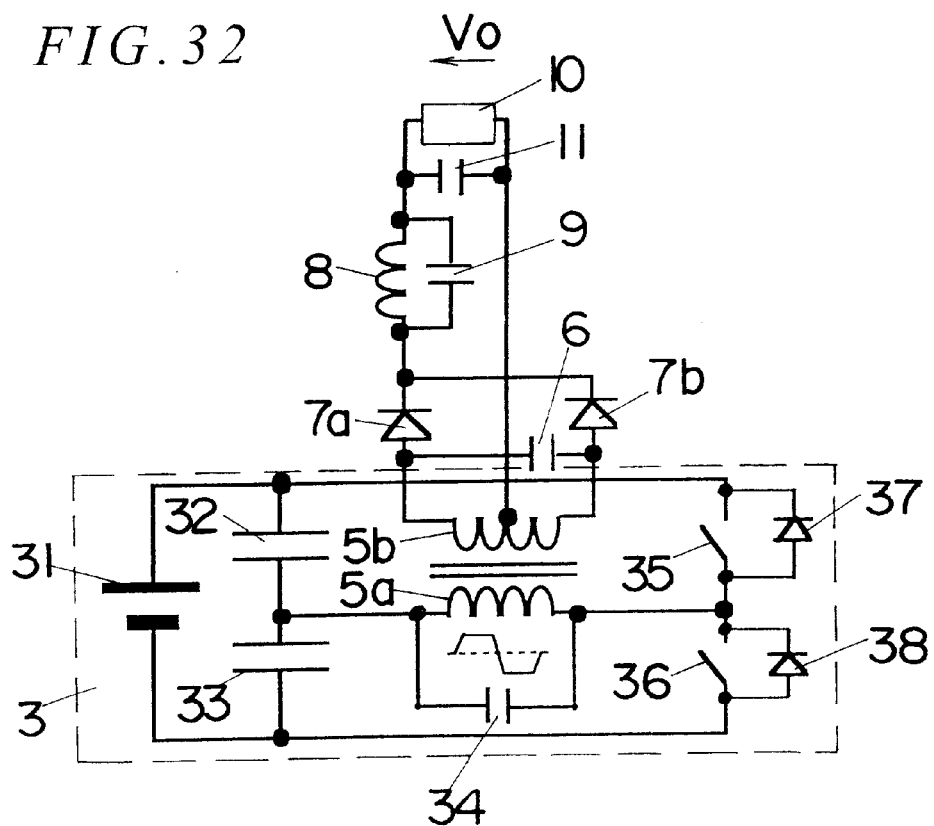
FIG. 32 is a circuit diagram of the system in accordance with a ninth embodiment of the present invention.

FIG. 32 is an embodiment in which the inverter circuit 3 on the primary side is a half-bridge configuration, and a resonance capacitor 34 is connected parallel to the primary winding 5a to provide a partial-resonance type inverter. The power source is expressed as a DC power source 31 by omitting the AC power source 1 and the input rectifying/smoothing circuit 2. The inverter circuit 3 includes the DC power source 31, the serial circuit of capacitors 32, 33 and the serial circuit of switching elements 35, 36 connected parallel to the DC power source 31, diodes 37,38 connected parallel to the switching elements 35, 36, respectively, and the parallel circuit of the primary winding 5a and the resonance capacitor 34 connected to the connecting point of the capacitors 32, 33 and to the connecting point of the switching elements 35, 36. The voltage waveform applied to the primary winding 5a exhibits a trapezoidal wave shape, the switching loss of the switching elements 35, 36 is reduced, and the noise also be reduced, so that not only the secondary side but also the primary side are made small in size. Therefore, there is provided a small-size non-contact electrical power transmission system capable of stabilizing the output terminal voltage V0 in a wide load range from near no-load to full-load.

Figure 33:
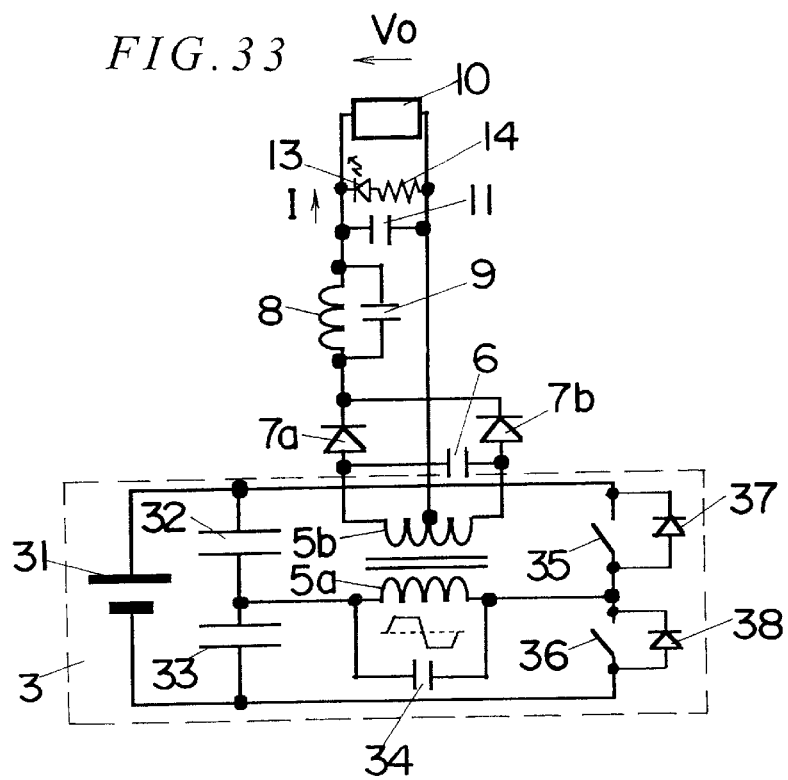
FIG. 33 is a circuit diagram of the system in accordance with a tenth embodiment of the present invention.
Figure 34:
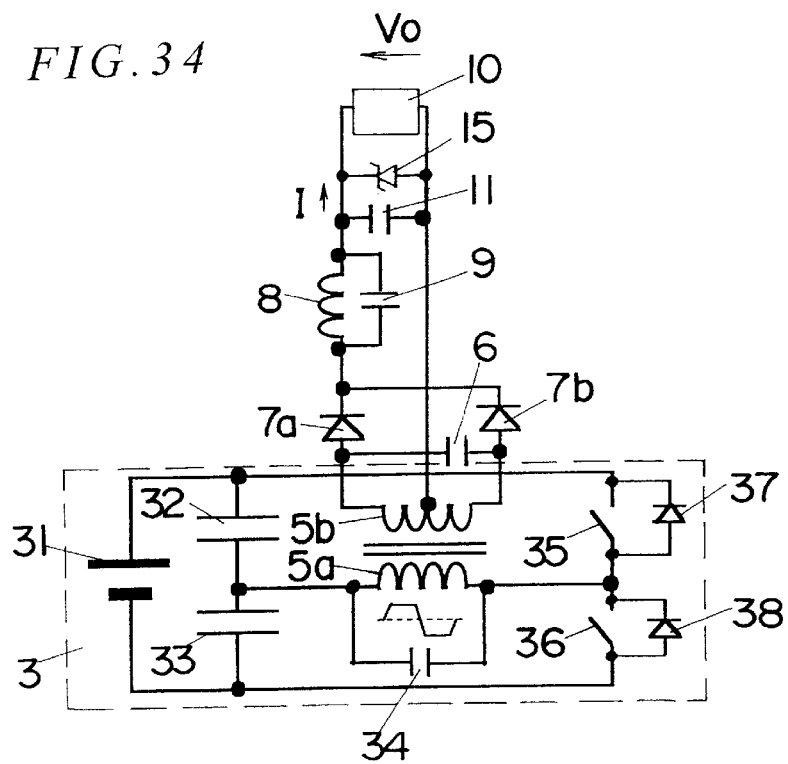
FIG. 34 is a circuit diagram of the system in accordance with an eleventh embodiment of the present invention.

However, even when restraining the output terminal voltage V0 as shown in the above-mentioned embodiment, a rise of the output terminal voltage V0 occurs near the no-load region as shown in FIG. 29. To restrain the rise, it suffices to connect to the output terminal (connect parallel to a load) a dummy load such as a resistance, a constant-voltage element, a light-emitting element or a display element, any of which can flow the load current I at all time in the point E of FIG. 29. The load current I becomes small when the output terminal voltage V0 rises, so that common small-size electronic parts are used, thereby preventing the size from becoming large. FIG. 33 is an example in which the serial circuit of a light-emitting diode 13 and a resistance 14 as a dummy load is connected to the output terminal. In this system, it is desirable that there is a function of informing a user on whether a power is transmitted to the secondary side, and thus using the light-emitting diode 13 both as the dummy load and power transmission informing parts can prevent the size from becoming large. FIG. 34 is an example in which a constant-voltage element 15 as a dummy load is connected to the output terminal. This not only allows the output terminal voltage V0 to be stabilized, but also constrains the output terminal voltage V0 to a constant value even if a transient abnormal voltage develops on the secondary side due to some cause.

APPLIED EXAMPLE

The present invention relates to a non-contact electrical power transmission system utilizing electromagnetic induction. When this system is applied to a detachable plug and an outlet, an exposed metallic contact is unnecessary, thereby eliminating the danger of an electric shock and poor contact. Indoors, this system is suitable for a power supply source in the places relating to water such as a bathroom, a washroom, a kitchen and a toilet.

Figure 37:
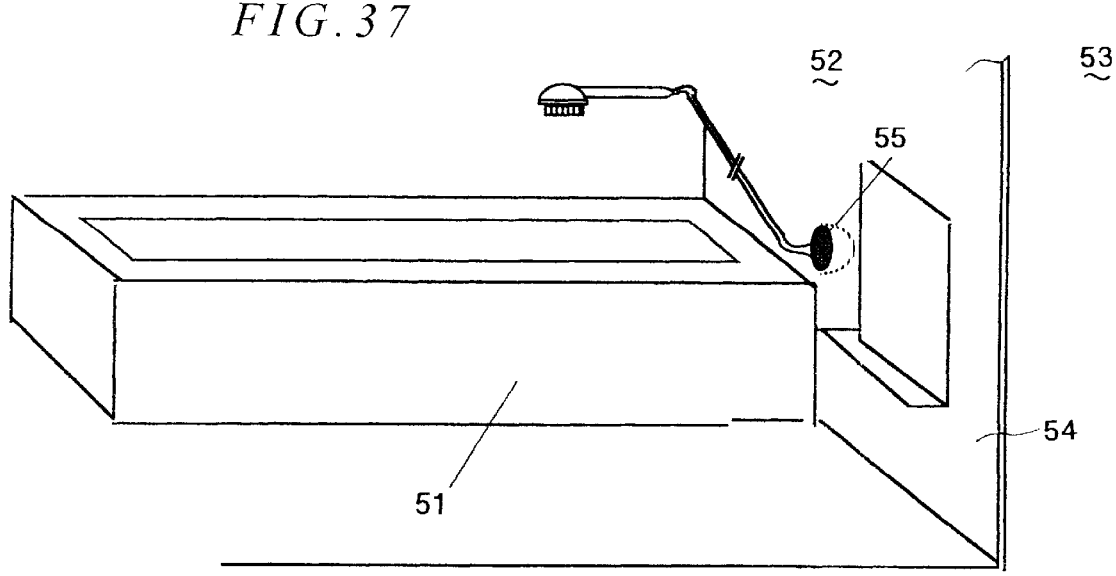
FIG. 37 is a perspective view showing a power feeding section to which the system of the present invention is applied.
Figures 38A, 38B:
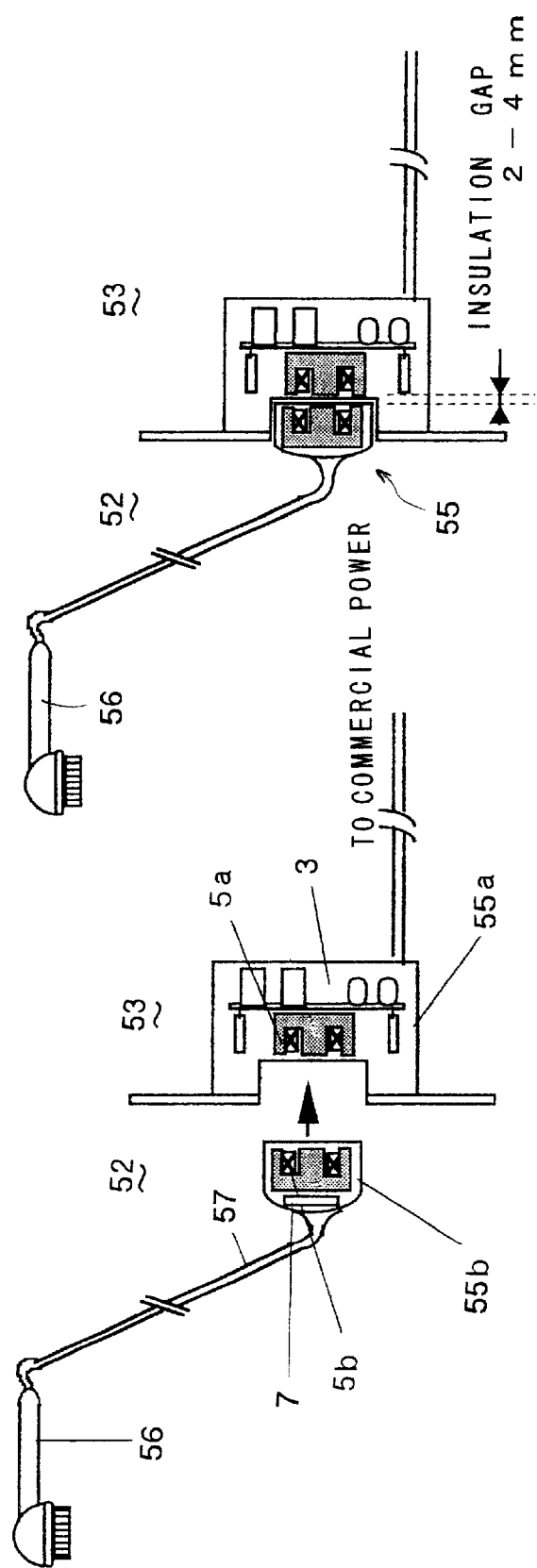
FIG. 38(A) is a view showing a condition in which a plug and an outlet are not coupled in the above-mentioned application example.
FIG. 38(B) is a view showing a condition in which the plug and the outlet have been coupled.

FIG. 37 shows an example in which this system is applied to a bathroom outlet system. FIG. 38(A) shows a condition in which the plug and outlet of the system have not been connected. FIG. 38(B) shows a condition in which the plug and outlet of the system are connected. In these figures, a wall 54 dividing the room into a bathroom interior 52 including a bathtub 51 and a bathroom exterior 53 is provided with a power feed section 55 to which this system is applied. In the power feed section 55, the primary side as an outlet is buried in the wall. The primary coil 5a receives high-frequency AC from a commercial power source to generate a high-frequency flux. The primary coil 5a is opened through an insulator to the bathroom interior 52, the opening serving as an outlet 55a. An inverter 3 is contained in the outlet 55a. As an example of a load apparatus 56, a motor-driven brush for cleaning the bathroom is shown. The load apparatus 56 receives power through a cord 57 from a plug 55b. The plug 55b contains a waterproof-secondary coil 5b integral with an electrical insulator. The plug 55b is attached to or removed from the outlet 55a to begin or stop power transmission. The operation voltage of the load apparatus 56 is set at, for example, about 12 V.

Applying the present invention allows a voltage to be maintained at about 12 V in a range from a heavy load when rotating a motor to a no load or a light load (such as for LED lamp display). In the prior art, the voltage drop is large proportional to the load to degrade the performance of an apparatus, or even to damage the apparatus. Monitoring the voltage of a load apparatus to perform active control by PAW control and the like in order to stabilize the output voltage increases the size and cost of an outlet and a plug. Applying the present invention eliminates the need for active control. Even when combining active control with the present invention, only a few parts need to be added, thereby reducing a burden of size and cost. In a bathroom, it is necessary to provide sufficient electric shock prevention. It suffices to fill the circuit or coil contained the outlet and plug with a potting material and to insulate the coil and core with an insulating bobbin.

The application of the present invention is suitable for a power feed section provided on the garden, park, road and the like subject directly to rain outdoors, for a power fed section for transmitting power from inside a room or vehicle through a window glass to outdoors, and for a power feed section under water. The lack of problems with poor contact makes this system suitable for power transmission in dusty outdoor locations or salty places such as the seaside. With this system, power transmission is performed through an insulator, so that power transmission is performed from outside into a tightly-closed space containing bacteria, hazardous material and the like. Making the coupling of the primary coil and the secondary coil exhibit an axially-symmetric shape allows power transmission to be performed at a rotatable area such as a robot arm.

Also, the present invention is not limited to the configurations of the above-mentioned embodiments, and may be embodied in various modifications, so that the present invention includes configurations, which are equivalent in circuit and mechanism and easily replaceable, such as output rectifying systems, waveforms of voltage applied to the primary winding, primary side circuit systems, and kinds of loads.

What is claimed is:

1. A non-contact electrical power transmission system comprising:
   a transformer separable/detachable between a primary winding and a secondary winding;
   a capacitor connected in parallel with said secondary winding of said transformer;
   an output terminal on said secondary winding side;
   said output terminal being connectable to a load;
   a high-frequency AC voltage supplied to said primary winding induces an induction voltage to be generated on the secondary winding by the electromagnetic induction action, whereby an electrical power is supplied to a load connected to said output terminal;
   said voltage supplied to said load is substantially constant either while said load current varies, or said load varies;
   in a first condition, at a time of a maximum load (load current Imax), the time of the reversal of the voltage polarity of said primary winding substantially coincides with a time when an oscillating voltage of said capacitor reaches at least one of a maximum or minimum value;
   in a second condition, at a time of a minimum load (load current Imin), the time of the reversal of the voltage polarity of said primary winding substantially coincides with the time when the oscillating voltage of said capacitor completes one cycle; and a capacitance of said capacitor is set to satisfy simultaneously said first and second conditions, thereby making substantially constant the load voltage in a load current range from Imin to Imax.

2. A non-contact electrical power transmission system as set forth in claim 1, wherein:

at the time of a minimum load (load current Imin), instead of the second condition described in claim 1, taking as a second condition that the time of the reversal of the voltage polarity of the primary winding substantially coincides with the time of starting oscillation of the oscillating voltage of said capacitor, and that the next time of the reversal of the voltage polarity of the primary winding substantially coincides with the time when the oscillating voltage of said capacitor completes one cycle; and said capacitance of said capacitor simultaneously satisfying said first and second conditions.

3. A non-contact electrical power transmission system as set forth in claim 1, wherein when expressing a leakage inductance converted to the secondary side of said transformer as L02, the capacitance of said capacitor as C2, and the frequency of said high-frequency AC voltage as f, circuit constants are set so as to satisfy the condition formula $$4 \cdot \pi \cdot f \cdot (L02\_EC2)^{1/2} = 1.$$

4. A non-contact electrical power transmission system as set forth in claim 1, wherein, in a load current range smaller than a minimum value of said load current, a dummy load for flowing a current equal to or larger than said minimum value is connected between said output terminals.

5. A non-contact electrical power transmission system as set forth in claim 1, wherein said drive circuit for supplying said high-frequency AC voltage to said primary winding, varies a frequency of said high-frequency AC voltage automatically to maintain said load current within a range which maintains substantially constant said voltage supplied to said load.

6. A non-contact electrical power transmission system as set forth in claim 5, wherein said drive circuit includes means for varying said frequency so that, the larger the load current, the higher the frequency of said high-frequency AC voltage automatically becomes.

7. A non-contact electrical power transmission system as set forth in claim 5, wherein at least one of the rising time and the fall time of said high-frequency AC voltage from said drive circuit automatically varies so as to correspond to a change of the load current, whereby the frequency of said high-frequency AC voltage varies.

8. A non-contact electrical power transmission system as set forth in claim 7, wherein:

said drive circuit includes a resonating capacitor connected in parallel with said primary winding; and at least one of the rising time and the falling time of said high-frequency AC voltage is determined by a resonance voltage of said resonating capacitor and a leakage inductance component.

9. A non-contact electrical power transmission system as set forth in claim 1, wherein said drive circuit includes means for varying a waveform of said high-frequency AC voltage so that a voltage supplied to said load remains substantially constant.

10. A non-contact electrical power transmission system as set forth in claim 9, wherein said high-frequency AC voltage varies in the voltage waveform so that an equivalent voltage amplitude of the high-frequency AC voltage increases/decreases corresponding to increases/decreases of said load current.

11. A non-contact electrical power transmission system as set forth in claim 10, wherein said voltage waveform of said high-frequency AC voltage is a trapezoidal wave shape, and an inclination of an oblique side of said voltage waveform varies corresponding to the load current, whereby the equivalent voltage amplitude varies to maintain said load voltage substantially constant.

12. A non-contact electrical power transmission system as set forth in claim 11, wherein:

said drive circuit includes a resonating capacitor connected in parallel with said primary winding, in which drive circuit; and a waveform of at least one of a rising time and a falling time of said high-frequency AC voltage is determined by utilizing a resonance voltage by said resonating capacitor and a leakage inductance component.

13. A non-contact electrical power transmission system as set forth in claim 12, wherein said drive circuit is a resonance-type inverter.

14. A non-contact electrical power transmission system as set forth in claim 13, wherein said drive circuit is a partial resonance-type inverter having a resonating capacitor connected in parallel with said primary winding for resonance with an inductance of said primary winding.

15. A non-contact electrical power transmission system as set forth in claim 13, wherein said drive circuit includes a voltage resonance circuit by said primary winding and the resonating capacitor connected parallel to said primary winding, and the voltage waveform of said high-frequency AC voltage is a sinusoidal wave shape.

16. A non-contact electrical power transmission system as set forth in claim 14, wherein in the drive circuit, the on-time of a switching element switched in said drive circuit is constant, and during a period when a partial resonance develops, in at least one of the rising time and the falling time of the voltage waveform of said high-frequency AC voltage, at least one of the time of the period and the voltage waveform in the period varies.

17. A non-contact electrical power transmission system as set forth in claim 16, wherein said inverter is a half-bridge type inverter.

18. A non-contact electrical power transmission system as set forth in claim 16, wherein said inverter is a push-pull type inverter.

19. A non-contact electrical power transmission system as set forth in claim 17, wherein said inverter includes a feedback winding and an auxiliary winding each magnetically coupled to the primary winding of said transformer, a voltage-drive type switching element to which an input voltage at the control terminal is given through the feedback winding, and a charging/discharging circuit connected between both ends of the auxiliary winding for controlling said input voltage, and in that said inverter is a self-excited inverter which when a charging voltage due to the induced voltage of the auxiliary winding reaches a predetermined voltage, lowers said input voltage to cause said switching element to be turned off.

20. A non-contact electrical power transmission system as set forth in claim 19, wherein, under light-load conditions, a resistance connected between output terminals flows a current at least as large as said minimum value.

21. A non-contact electrical power transmission system comprising:

an inverter circuit including a transformer having a structure in which a primary winding and a secondary winding on which a voltage is induced by said primary winding are separable and detachable;

a first capacitor connected to said secondary winding side for matching a load;

a rectifier circuit for rectifying a voltage induced in said secondary winding;

a current smoothing reactor for smoothing an output current of said rectifier circuit;

an output terminal to which a smoothed output by said reactor is supplied and a load is connected;

an inductance of said reactor has a value effective to reduce changes in a load current when the output current of said rectifier circuit is changed from a discontinuous condition to a continuous condition, thereby restraining a rise of said output voltage when said load is no-load or minute-load.

22. A non-contact electrical power transmission system as set forth in claim 21, further comprising:

a dummy load connected across an output of said system; and said dummy load having a resistance effective to maintain at least a minimum load current load current.

23. A non-contact electrical power transmission system as set forth in claim 21, further comprising:

a second capacitor connected in parallel with said current smoothing reactor; and a capacitance of said second capacitor having a value effective to produce an AC voltage component of a voltage on an input side of said current smoothing reactor having a sinusoidal shape.

24. A non-contact electrical power transmission system as set forth in claim 23, wherein said capacitance of said second capacitor has a value effective to maintain an output terminal voltage substantially equal to an AC voltage on the input side of said current smoothing reactor.

25. A non-contact electrical power transmission system as set forth in claim 23, wherein when a load is made increased gradually from no-load, the electrostatic capacity of said second capacitor is set so that the load current value when the zero period of the output current of said rectifier circuit being zero dissipates becomes a minimum.

26. A non-contact electrical power transmission system as set forth in claim 23, wherein a resonance frequency determined by an inductance value of said current-smoothing reactor and a capacitance of said second capacitor is equal to twice the frequency of the voltage applied to the primary winding.

27. A non-contact electrical power transmission system as set forth in claim 21, wherein a resonance frequency determined by the capacitance of said first capacitor and a leakage inductance value converted to the secondary side of the separable/detachable transformer is equal to twice the frequency of the voltage applied to the primary winding.

28. A non-contact electrical power transmission system as set forth in claim 21, further comprising:

a center tap on a secondary of said transformer;

a full-wave rectifier circuit;

said rectifier circuit including two diodes;

one terminal of each of said diodes is connected to opposed outer terminals of said transformer;

second terminals of said two diodes being connected together;

said second terminals being connected to one side of a load;

a second side of said load being connected to said center tap.

29. A non-contact electrical power transmission system as set forth in claim 21, wherein, when making the inductance value of said current-smoothing reactor large causes the magnitude of a load to be changed, the load current value when the output current of said rectifier circuit is changed from a discontinuous condition to a continuous condition remains small, thereby restraining a rise of the output terminal voltage when the load is no-load or minute-load.

30. A non-contact electrical power transmission system comprising:

a source of AC power;

a transformer having a primary winding and a secondary winding, said secondary winding having a center tap;

a full-wave rectifier coupled to outer ends of said secondary winding and to said center tap; and a tuning capacitor connected in parallel with said secondary winding, a capacitance of said tuning capacitor being selected so that an output voltage at a load is automatically stabilized without active feedback control as the load changes between maximum and minimum.

31. A system according to claim 30 wherein said source of AC power includes means for changing a waveform of said AC power to produce a voltage average amplitude effective for maintaining an output of said system substantially constant.

32. A system according to claim 31 wherein said waveform changes between a square wave and a trapezoidal wave to control said voltage average amplitude.

* * * * *